(12) United States Patent
Libin et al.

(10) Patent No.: US 8,261,319 B2
(45) Date of Patent: Sep. 4, 2012

(54) LOGGING ACCESS ATTEMPTS TO AN AREA

(75) Inventors: Phil Libin, Cambridge, MA (US); Silvio Micali, Brookline, MA (US); David Engberg, Cambridge, MA (US)

(73) Assignee: CoreStreet, Ltd., Cambridge, MA (US)

( * ) Notice: Subject to any disclaimer, the term of this patent is extended or adjusted under 35 U.S.C. 154(b) by 988 days.

(21) Appl. No.: 10/893,174

(22) Filed: Jul. 16, 2004

(65) Prior Publication Data
US 2005/0044402 A1   Feb. 24, 2005

Related U.S. Application Data

(60) Provisional application No. 60/488,645, filed on Jul. 18, 2003, provisional application No. 60/505,640, filed on Sep. 24, 2003.

(51) Int. Cl.
*G06F 7/04* (2006.01)
(52) U.S. Cl. ............... 726/2; 726/3; 726/4; 340/5.7
(58) Field of Classification Search ............ 713/182, 713/184, 186, 193; 726/2–4; 340/5.2, 5.6, 340/5.61, 5.7, 5.71, 5.8, 5.81
See application file for complete search history.

(56) References Cited

U.S. PATENT DOCUMENTS

| | | | |
|---|---|---|---|
| 4,200,770 A | 4/1980 | Hellman et al. | |
| 4,218,582 A | 8/1980 | Hellman et al. | |
| 4,309,569 A | 1/1982 | Merkle | |
| 4,326,098 A | 4/1982 | Bouricius et al. | |
| 4,825,052 A | 4/1989 | Chemin et al. | |
| 4,879,747 A | 11/1989 | Leighton et al. | |

(Continued)

FOREIGN PATENT DOCUMENTS

CN         2504689 Y        8/2002

(Continued)

OTHER PUBLICATIONS

Facsimile message from Chini Krishnan of Integris Security, Inc. to Professor Silvio Micali, dated Feb. 17, 1997, 7 pages including cover sheet, submitted in attached sealed envelope as Proprietary Material Not Open to Public. To Be Opened Only by Examiner or Other Authorized U.S. Patent and Trademark Office Employee.

(Continued)

*Primary Examiner* — Kim Vu
*Assistant Examiner* — Suman Debnath
(74) *Attorney, Agent, or Firm* — Muirhead and Saturnelli, LLC

(57) ABSTRACT

Logging events associated with accessing an area includes recording an event associated with accessing the area to provide an event recording and authenticating at least the event recording to provide an authenticated recording. Recording an event may include recording a time of the event. Recording an event may include recording a type of event. The event may be an attempt to access the area. Recording an event may include recording credentials/proofs used in connection with the attempt to access the area. Recording an event may include recording a result of the attempt. Recording an event may include recording the existence of data other than the credentials/proofs indicating that access should be denied. Recording an event may include recording additional data related to the area. Authenticating the recording may include digitally signing the recording. Authenticating at least the event recording may include authenticating the event recording and authenticating other event recordings to provide a single authenticated recording.

40 Claims, 10 Drawing Sheets

U.S. PATENT DOCUMENTS

| | | |
|---|---|---|
| 4,881,264 A | 11/1989 | Merkle |
| 4,888,801 A | 12/1989 | Foster et al. |
| 4,926,480 A | 5/1990 | Chaum |
| 4,943,707 A | 7/1990 | Boggan |
| 4,944,009 A | 7/1990 | Micali et al. |
| 4,995,081 A | 2/1991 | Leighton et al. |
| 5,003,597 A | 3/1991 | Merkle |
| 5,005,200 A | 4/1991 | Fischer |
| 5,016,274 A | 5/1991 | Micali et al. |
| 5,058,161 A | 10/1991 | Weiss |
| 5,097,504 A | 3/1992 | Camion et al. |
| 5,136,646 A | 8/1992 | Haber et al. |
| 5,136,647 A | 8/1992 | Haber et al. |
| 5,157,726 A | 10/1992 | Merkle et al. |
| 5,204,663 A | 4/1993 | Lee |
| 5,214,702 A | 5/1993 | Fischer |
| 5,231,666 A | 7/1993 | Matyas |
| 5,261,002 A | 11/1993 | Perlman et al. |
| 5,276,737 A | 1/1994 | Micali |
| 5,299,263 A | 3/1994 | Beller et al. |
| 5,307,411 A | 4/1994 | Anvret et al. |
| 5,315,657 A | 5/1994 | Abadi et al. |
| 5,315,658 A | 5/1994 | Leighton et al. |
| 5,340,969 A | 8/1994 | Cox |
| 5,351,302 A | 9/1994 | Micali |
| 5,371,794 A | 12/1994 | Diffie et al. |
| 5,396,624 A | 3/1995 | Campbell, Jr. |
| RE34,954 E | 5/1995 | Haber et al. |
| 5,420,927 A | 5/1995 | Micali |
| 5,432,852 A | 7/1995 | Leighton et al. |
| 5,434,919 A | 7/1995 | Chaum |
| 5,450,493 A | 9/1995 | Maher |
| 5,497,422 A | 3/1996 | Tysen et al. |
| 5,499,296 A | 3/1996 | Micali |
| 5,510,777 A | 4/1996 | Pilc et al. |
| 5,519,778 A | 5/1996 | Leighton et al. |
| 5,537,475 A | 7/1996 | Micali |
| 5,544,322 A | 8/1996 | Cheng et al. |
| 5,551,027 A | 8/1996 | Choy et al. |
| 5,553,145 A | 9/1996 | Micali |
| 5,592,553 A | 1/1997 | Guski et al. |
| 5,604,804 A | 2/1997 | Micali |
| 5,606,617 A | 2/1997 | Brands et al. |
| 5,610,982 A | 3/1997 | Micali |
| 5,615,268 A | 3/1997 | Bisbee et al. |
| 5,615,269 A | 3/1997 | Micali |
| 5,629,982 A | 5/1997 | Micali |
| 5,638,447 A | 6/1997 | Micali |
| 5,659,616 A | 8/1997 | Sudia |
| 5,659,617 A | 8/1997 | Fischer |
| 5,666,414 A | 9/1997 | Micali |
| 5,666,415 A | 9/1997 | Kaufman |
| 5,666,416 A | 9/1997 | Micali |
| 5,666,420 A | 9/1997 | Micali |
| 5,677,955 A | 10/1997 | Doggett et al. |
| 5,687,235 A | 11/1997 | Perlman et al. |
| 5,699,431 A | 12/1997 | Van Oorschot et al. |
| 5,717,757 A | 2/1998 | Micali |
| 5,717,758 A | 2/1998 | Micali |
| 5,717,759 A | 2/1998 | Micali |
| 5,742,035 A | 4/1998 | Kohut |
| RE35,808 E | 5/1998 | Micali |
| 5,748,738 A | 5/1998 | Bisbee et al. |
| 5,751,812 A | 5/1998 | Anderson |
| 5,768,379 A * | 6/1998 | Girault et al. ............... 713/185 |
| 5,774,552 A | 6/1998 | Grimmer |
| 5,790,665 A | 8/1998 | Micali |
| 5,790,790 A | 8/1998 | Smith et al. |
| 5,793,868 A | 8/1998 | Micali |
| 5,799,086 A | 8/1998 | Sudia |
| 5,812,670 A | 9/1998 | Micali |
| 5,825,880 A | 10/1998 | Sudia et al. |
| 5,826,262 A | 10/1998 | Bui et al. |
| 5,841,122 A | 11/1998 | Kirchhoff |
| 5,841,865 A | 11/1998 | Sudia |
| 5,850,451 A | 12/1998 | Sudia |
| 5,857,022 A | 1/1999 | Sudia |
| 5,867,578 A | 2/1999 | Brickell et al. |
| 5,875,894 A | 3/1999 | Stromme |
| 5,887,131 A | 3/1999 | Angelo |
| 5,903,651 A | 5/1999 | Kocher |
| 5,903,882 A | 5/1999 | Asay et al. |
| 5,960,083 A | 9/1999 | Micali |
| 5,969,633 A | 10/1999 | Rösler |
| 5,982,898 A | 11/1999 | Hsu et al. |
| 5,995,625 A | 11/1999 | Sudia et al. |
| 6,009,177 A | 12/1999 | Sudia |
| 6,026,163 A | 2/2000 | Micali |
| 6,041,410 A | 3/2000 | Hsu et al. |
| 6,044,462 A | 3/2000 | Zubeldia et al. |
| 6,061,448 A | 5/2000 | Smith et al. |
| 6,097,811 A | 8/2000 | Micali |
| 6,119,137 A | 9/2000 | Smith et al. |
| RE36,918 E | 10/2000 | Micali |
| 6,134,326 A | 10/2000 | Micali et al. |
| 6,137,884 A | 10/2000 | Micali |
| 6,141,750 A | 10/2000 | Micali |
| 6,151,675 A | 11/2000 | Smith |
| 6,182,221 B1 | 1/2001 | Hsu et al. |
| 6,189,103 B1 | 2/2001 | Nevarez et al. |
| 6,192,407 B1 | 2/2001 | Smith et al. |
| 6,209,091 B1 | 3/2001 | Sudia et al. |
| 6,216,231 B1 | 4/2001 | Stubblebine |
| 6,292,893 B1 | 9/2001 | Micali |
| 6,300,873 B1 | 10/2001 | Kucharczyk et al. |
| 6,301,659 B1 | 10/2001 | Micali |
| 6,385,655 B1 | 5/2002 | Smith et al. |
| 6,397,329 B1 | 5/2002 | Aiello et al. |
| 6,404,337 B1 | 6/2002 | Van Till et al. |
| 6,442,689 B1 | 8/2002 | Kocher |
| 6,470,086 B1 | 10/2002 | Smith |
| 6,487,599 B1 | 11/2002 | Smith et al. |
| 6,487,658 B1 | 11/2002 | Micali |
| 6,502,191 B1 | 12/2002 | Smith et al. |
| 6,516,411 B2 | 2/2003 | Smith |
| 6,529,956 B1 | 3/2003 | Smith et al. |
| 6,532,540 B1 | 3/2003 | Kocher |
| 6,609,196 B1 | 8/2003 | Dickinson, III et al. |
| 6,609,198 B1 | 8/2003 | Wood et al. |
| 6,651,166 B1 | 11/2003 | Smith et al. |
| 6,658,568 B1 | 12/2003 | Ginter et al. |
| 6,671,805 B1 | 12/2003 | Brown et al. |
| 6,725,381 B1 | 4/2004 | Smith et al. |
| 6,748,529 B2 | 6/2004 | Smith et al. |
| 6,766,450 B2 | 7/2004 | Micali |
| 6,826,609 B1 | 11/2004 | Smith et al. |
| 7,124,302 B2 | 10/2006 | Ginter et al. |
| 7,196,610 B2 * | 3/2007 | Straumann et al. .......... 340/5.61 |
| 2001/0002487 A1 * | 5/2001 | Grawrock et al. ............ 713/193 |
| 2001/0011255 A1 | 8/2001 | Asay et al. |
| 2001/0050990 A1 | 12/2001 | Sudia |
| 2002/0013898 A1 | 1/2002 | Sudia et al. |
| 2002/0029200 A1 | 3/2002 | Dulin et al. |
| 2002/0029337 A1 | 3/2002 | Sudia et al. |
| 2002/0062438 A1 | 5/2002 | Asay et al. |
| 2002/0107814 A1 | 8/2002 | Micali |
| 2002/0149467 A1 * | 10/2002 | Calvesio et al. ............. 340/5.52 |
| 2002/0165824 A1 | 11/2002 | Micali |
| 2002/0184182 A1 | 12/2002 | Kwan |
| 2003/0014365 A1 | 1/2003 | Inada et al. |
| 2003/0025590 A1 | 2/2003 | Gokcebay et al. |
| 2003/0065921 A1 | 4/2003 | Chang |
| 2003/0093295 A1 * | 5/2003 | Lilly et al. ....................... 705/2 |
| 2003/0212888 A1 | 11/2003 | Wildish et al. |
| 2003/0221101 A1 | 11/2003 | Micali |
| 2004/0049675 A1 | 3/2004 | Micali et al. |
| 2004/0064691 A1 | 4/2004 | Lu et al. |
| 2004/0064731 A1 | 4/2004 | Nguyen et al. |
| 2004/0111607 A1 | 6/2004 | Yellepeddy |
| 2004/0237031 A1 | 11/2004 | Micali et al. |
| 2005/0010783 A1 | 1/2005 | Libin et al. |
| 2005/0033962 A1 | 2/2005 | Libin et al. |
| 2005/0044376 A1 | 2/2005 | Libin et al. |
| 2005/0044386 A1 | 2/2005 | Libin et al. |
| 2005/0044402 A1 | 2/2005 | Libin et al. |
| 2005/0055548 A1 | 3/2005 | Micali |
| 2005/0055567 A1 | 3/2005 | Libin et al. |

| | | | |
|---|---|---|---|
| 2005/0099288 | A1 | 5/2005 | Spitz et al. |
| 2005/0114653 | A1 | 5/2005 | Sudia |
| 2005/0114666 | A1 | 5/2005 | Sudia |
| 2005/0154878 | A1 | 7/2005 | Engberg et al. |
| 2005/0154918 | A1 | 7/2005 | Engberg |
| 2005/0155879 | A1 | 7/2005 | Engberg et al. |
| 2005/0193204 | A1 | 9/2005 | Engberg et al. |
| 2006/0029261 | A1 | 2/2006 | Hoffman et al. |
| 2006/0097843 | A1 | 5/2006 | Libin |
| 2006/0283938 | A1* | 12/2006 | Kumar et al. ........... 235/382 |

FOREIGN PATENT DOCUMENTS

| | | |
|---|---|---|
| DE | 40 26 439 A1 | 3/1991 |
| DE | 197 33 374 A1 | 2/1998 |
| DE | 101 28 146 A1 | 12/2002 |
| DE | 101 47 936 A1 | 4/2003 |
| EP | 0 618 550 A1 | 3/1994 |
| EP | 0 723 251 A2 | 1/1996 |
| EP | 0 716 399 A | 6/1996 |
| EP | 0 798 671 A2 | 2/1997 |
| EP | 1 024 239 A1 | 1/1999 |
| FR | 2 774 833 A1 | 2/1998 |
| GB | 2236797 | 4/1991 |
| JP | 10-280754 A | 10/1998 |
| JP | 2000-003492 | 1/2000 |
| WO | WO 98/26385 | 6/1998 |
| WO | WO 98/43152 | 10/1998 |
| WO | WO 00/22787 | 4/2000 |
| WO | WO 01/06701 A1 | 1/2001 |
| WO | WO 01/11812 A2 | 2/2001 |
| WO | WO 01/11843 | 2/2001 |
| WO | WO 01/25874 A2 | 4/2001 |
| WO | WO 01/57806 A | 8/2001 |
| WO | WO 02/08551 A | 1/2002 |

OTHER PUBLICATIONS

Facsimile message from Chini Krishnan of Integris Security, Inc. to Professor Silvio Micali, dated Feb. 25, 1997, 13 pages including cover sheet, submitted in attached sealed envelope as Proprietary Material Not Open to Public. To Be Opened Only by Examiner or Other Authorized U.S. Patent and Trademark Office Employee.
"Distributed Certificate Validation: The answer to validation scalability, availability and cost issues," *CoreStreet White Paper*, published at www.corestreet.com, Jun. 12, 2003, 14 pp.
"Distributed OCSP: Security, Scalability, and Availability for Certificate Validation," *CoreStreet White Paper*, published at www.corestreet.com, 2002, 4 pp.
"Real Time Credential Validation: Secure, Efficient Permissions Management," *CoreStreet White Paper*, published at www.corestreet.com, 2002, 5 pp.
"Real Time Credential Validation: Secure, Efficient Permissions Management," *CoreStreet White Paper*, published at www.corestreet.com, 2002-2004, 5 pp.
"Identity Services Infrastructure™: A practical approach to ensuring trust and privacy in government and industry," *CoreStreet White Paper*, published at www.corestreet.com, 2006, 13 pp.
"The Roles of Authentication, Authorization & Cryptography in Expanding Security Industry Technology," Security Industry Association, *Quarterly Technical Update*, Dec. 2005, 32 pp.
"Important FIPS 201 Deployment Considerations: Ensuring Your Implementation is Future-Ready," *White paper*, published at www.corestreet.com, 2005-2006, 11 pp.
"Vulnerability Analysis of Certificate Validation Systems," *CoreStreet White Paper*, published at www.corestreet.com, 2006, 15 pp.
"The Role of Practical Validation for Homeland Security," *CoreStreet White Paper*, published at www.corestreet.com, 2002-2004, 3 pp.
"Distributed Certificate Validation," *CoreStreet White Paper*, published at www.corestreet.com, 2006, 16 pp.
"Certificate Validation Choices: Evaluation criteria for selecting the appropriate validation mechanism for your needs," *CoreStreet white paper*, published at www.corestreet.com, 2002-2004, 8 pp.
"Nonce Sense: Freshness and Security in OCSP Responses," *CoreStreet White Paper*, published at www.corestreet.com, 2003-2004, 2 pp.

"Sistema Distruito Per II Controllo Della Validita Dei Certificati Digitali: Prestazioni—Disponibilita'—Costi," *CoreStreet White Paper*, published at www.corestreet.com, visited Aug. 7, 2006, 17 pp.
"Analisi Della Vunlerabilita' Dei Sistemi Di Convalida Dei Certificati Digitali," *CoreStreet White Paper*, published at www.corestreet.com, visited Aug. 7, 2006, 17 pp.
Jon Shamah, "From eID to Identity Services Infrastructure—Practical implementations for sustainable success," Presentation, published at www.corestreet.com, *e-Id Conference (Brussels, Belgium)*, Feb. 22, 2006, 48 pp.
"U.S. Department of Homeland Security First Responders Card Initiative," Transcript, *All Hazards Forum Conference and Exhibition*, Moderator Craig A. Wilson, Baltimore, Maryland, Oct. 26, 2005, 42 pp.
"Card-Connected System," *Functional Specification*, published at www.corestreet.com, 2005, 6 pp.
"Card-Connected System," *Architects and Engineers Specification*, published at www.corestreet.com, 2005, 11 pp.
"CoreStreet Validation Authority," *CoreStreet Data Sheet*, published at www.corestreet.com, 2006, 2 pp.
"Responder Appliance 2400," *CoreStreet Data Sheet*, published at www.corestreet.com, 2006, 1 p.
"Desktop Validation Client," *CoreStreet Data Sheet*, published at www.corestreet.com, 2006, 1 p.
"Server Validation Extension," *CoreStreet Data Sheet*, published at www.corestreet.com, 2006, 1 p.
"Path Builder System™: For Federated PKI," *CoreStreet Data Sheet*, published at www.corestreet.com, 2006, 1 p.
"PKI Toolkit: Developer toolkit to enable certificate validation," *CoreStreet Data Sheet*, published at www.corestreet.com, 2006, 1 p.
"MiniCRL," *CoreStreet data sheet*, published at www.corestreet.com, 2006, 1 p.
"PIVMAN™ System: Secure ID Checking," *CoreStreet Data Sheet*, published at www.corestreet.com, 2006, 1 p.
"The PIVMAN™ System: Implementing secure ID checking for site control in emergencies," *CoreStreet Product Implementation Overview*, published at www.corestreet.com, 2006, 4 pp.
"The PIVMAN™ System: Deployment and use case overview," *CoreStreet Product Application Overview*, published at www.corestreet.com, 2006, 4 pp.
"Card-Connected™. Access Control," *Corestreet Data Sheet*, published at www.corestreet.com, 2006, 1 p.
"FIPS 201 Solutions," *Corestreet Solutions Overview*, published at www.corestreet.com, 2005, 1 p.
"Common Criteria Factsheet: Understanding the importance of certification," Corestreet *Fact Sheet*, published at www.corestreet.com, 2006, 1 p.
"Security Requirements for Cryptographic Modules," *Federal Information Processing Standards (FIPS) Publication 140-2*, Information Technology Laboratory, National Institute of Standards and Technology, Gaithersburg, MD 20899, May 25, 2001.
"Final Text of Draft Amendments DAM 4 to ISO/IEC 9594-2, DAM 2 to ISO/IEC 9594-6, DAM 1 to ISO/IEC 9594-7, and DAM 1 to ISO/IEC 9594-8 on Certificate Extensions," *ISO/IEC JTC 1/SC 21/WG 4 and ITU-T Q 15/7 Collaborative Editing Meeting on the Directory*, Dec. 1996, 54 pp.
Christoffersson et al., *Crypto User's Handbook, A Guide for Implementors of Cryptographic Proteciion in Computer Systems*, Elsevier Science Publishers B. V., 1988, pp. 8-85.
M. Ito, et al., "Secret Sharing Scheme Realizing General Access Structure," Dept. of Electrical Communications, Tohoku University, Sendai, Miyagi 9890, Japan, 1987, pp. 3.6.1-3.6.4.
L. Gong, "Securely replicating authentication services," *Proceedings of the International Conference on Distributed Computing Systems*, IEEE Computer Society Press, 1989. pp. 85-91.
International Search Report from PCT/US 96/17374, dated Feb. 19, 1997, 3 pp.
C.J. Mitchell and F.C. Piper, "Key Storage in Secure Networks, " *Discrete Applied Mathematics*, vol. 21, No. 3, 1988, pp. 215-228.
D. Otway and O. Rees, "Efficient and timely mutual authentication," *SIGOPS Oper. Syst. Rev.* vol. 21, No. 1, Jan. 1987, pp. 8-10.

"The Digital Signature Standard," National Institute of Standards and Technology (NIST), Proposal and Discussion, *Comm. of the ACM*, 35 (7), Jul. 1992, pp. 36-54.

F. T. Leighton, "Failsafe Key Escrow Systems," *Technical Memo 483, MIT Lab. For Computer Science*, 1994, 9 pp.

B. Fox and B. LaMacchia, "Certificate Revocation: Mechanics and Meaning," *Proceedings of Financial Cryptography '98*, Lecture Notes in Computer Science 1465, Springer-Verlag, Jan 1998, pp. 158-164.

R. Blom, "An optional class of symmetric key generation schemes," Proceedings of Advances in Cryptology-EUROCRYPT'84, Lecture Notes in Computer Science 209, Spring-Verlag, 1985, pp. 335-338.

C. Blundo, et al., "Perfectly Secure Key Distribution for Dynamic Conferences" *Proceedings of Advances in Cryptology: CRYPTO '92*, Springer-Verlag, Berlin, 1993, pp. 471-486.

D. Beaver, "Multiparty Protocols Tolerating Half Faulty Processors," *Proceedings of Advances in Cryptology '89*, Lecture Notes in Computer Science 435, G. Brassard, Ed. Springer-Verlag, London, 1990, pp. 560-572.

B. Schneier, *Applied Cryptography* $2^{nd}$ ed.; John Wiley & Sons, Inc., 1996, pp. 42-65, 574-576, 591, 593.

"Escrowed Encryption Standard (EES)," *Federal Information Processing Standards (FIPS) Publication 185*, Computer Systems Laboratory, National Institute of Standards and Technology, Gaithersburg, MD 20899, Feb. 1994.

S. Chokhani, "Toward a National Public Key Infrastructure," *IEEE Communications Magazine*, vol. 32, No. 9, Sep. 1994, pp. 70-74.

M. Gasser, et al., "The Digital Distributed System Security Architecture," *Proc. $12^{th}$ National Computer Security Conference*, 1989, pp. 305-319.

R. L. Rivest, et al., "SDSI—A Simple Distributed Security Infrastructure," 1996, pp. 1-39.

D. L. Chaum, "Untraceable Electronic Mail, Return Addresses, and Digital Pseudonyms," Technical Note Programming Techniques and Data Structures, *Communications of the ACM*, vol. 24, No. 2, Feb. 1981, pp. 84-88.

R. Gennaro, et al., "Robust Threshold DSS Signatures,". *Proc. of Advances in Cryptology: EUROCRYPT '96*, Lecture Notes in Computer Science 1070, 1996, 20 pp.

"Public Key Infrastructure (PKI) Technical Specifications: Part D—Interoperability Profiles," (DRAFT) *Federal PKI Technical Working Group, Inc.*, Cygnacom Solutions, 1995, 91 pp.

N. Nazario, "Federal Public Key Infrastructure (PKI) Version 1 Technical Specifications: Part B—Technical Security Policy," *PKI Technical Working Group*, 1996, 21 pp.

S. Chokhani and W. Ford, "Certificate Policy and Certification Practice Statement Framework," (DRAFT) *CygnaCom Solutions, Inc.*, Nov. 1996, 80 pp.

William E. Burr, et al., "A Proposed Federal PKI Using X.509 V3 Certificates," *National Institute of Standards and Technology (NIST)*, Gaithersburg, MD 20899, 1996, 8 pp.

W.E. Burr, "Public Key Infrastructure (PKI) Technical Specifications (Version 1): Part C—Concept of Operations," (DRAFT) Feb. 1996, 30 pp.

Warwick Ford, "Public-Key Infrastructure Standards," *PP Presentation*, 1996, 15 pp.

William T. Polk, "Minimum Interoperability Specifications for PKI Components," *NIST presentation*, 1996, 13 pp.

Santosh Chokhani, Ph.D., "Security Considerations in Using X.509 Certificates," *PP Presentation*, 1996, 11 pp.

Donna F. Dodson, "PKI Implementation Projects," *NIST Presentation*, 1996, 17 pp.

William E. Burr, et al., "A Proposed Federal PKI Using X.509 V3 Certificates," *NIST Presentation*, 1996, 12 pp.

Noel A. Nazario, et al., "Management Model for the Federal Public Key Infrastructure," *NIST Presentation*, 1996, 9 pp.

Noel A. Nazario, "Security Policies for the Federal Public Key Infrastructure," *NIST Presentation*, 1996, 11 pp.

William Burr, et al., "Minimum Interoperability Specification for PKI Components," *Output of NIST's Cooperative Research and Development Agreements for Public Key Infrastructure development with AT&T, BBN, Certicom, Cylink, DynCorp, IRE, Motorola, Northern Telecom, Spyrus, and VeriSign*, DRAFT Version 1, 1996.

Farrell, et al., "Internet Public Key Infrastructure Part III: Certificate Management Protocols," *Internet Draft, PKIX Working Group*, Dec. 1996.

W. Polk, ed., "Requirements for the Federal Public Key Infrastructure (Version 1) Part A: Requirements," 1996, 19 pp.

Warwick Ford, "A Public Key Infrastructure for U.S. Government Unclassified but Sensitive Applications," *NORTEL/Bell-Northern Research, National Institute of Standards and Technology*, 1995, 94 pp.

B. Garner, ed., "A Dictionary of Modern Legal Usage," Oxford Univ. Press, 1987, p. 930.

L. Harn, "Group-Oriented (t, n) threshold digital signature scheme and digital multisignature," *IEE Proc-Comput. Digit. Tech.*, vol. 141, No. 5, Sep. 1994, pp. 307-313.

Oded Goldreich, "Two Remarks Concerning the Goldwasser-Micali-Rivest Signature Scheme," *Laboratory for Computer Science, Massachusetts Institute of Technology MIT/LCS/TM-315*, Sep. 1986, 10 pp.

S. Goldwasser, et al., "The Knowledge Complexity of Interactive Proof Systems," *Society for Industrial and Applied Mathematics (SIAM) J. Comput.*, vol. 18, No. 1, Feb. 1989, pp. 186-208.

"X9-Financial Services: American National Standard X9.55/1995," *American National Standards Institute, Accredited Standards Committee X9(Working Draft)*, Jul. 3, 1996, 41 pp.

S. Micali, et al., "An Efficient Zero-Knowledge Method for Answering Is He in or Out? Questions," *Abstract of talk given at International Computer Science Institute*, Berkeley, CA, Dec. 1995.

"Information technology—Open Systems Interconnection—The Directory: Authentication framework," *International Standard ISO/IEC 9594-8*, 1995, 41 pp.

Z. Galil, et al., "Partitioned Encryption and Achieving Simultaneity by Partitioning," *Information Processing* Letters 26 (1987/88), Oct. 1987, pp. 81-88.

Paul Neil Feldman, "Optimal Algorithms for Byzantine Agreement," *Thesis submitted for Doctor of Philosophy in Mathematics at the Massachusetts Institute of Technology*, May 1988.

B. Chor, et al., "Verifiable Secret Sharing and Achieving Simultaneity in the Presence of Faults," *IEEE*, 1985, pp. 383-395.

D. Chaum, "Security Without Identification: Transaction Systems to Make Big Brother Obsolete," Communications of the ACM, vol. 28, No. 10, Oct. 1985, pp. 1030-1044.

V. Varadharajan, "Notification: A Pratical Security Problem in Distributed Systems," *Proc. of the $14^{th}$ National Computer Security Conference*, National Institute of Standards and Technology / National Computer Security Center, Oct. 1-4, 1991, pp. 386-396.

Silvio Micali, "Computationally-Sound Proofs," *Laboratory for Computer Science, Massachusetts Institute of Technology*, Apr. 11, 1995, 56 pp.

Silvio Micali, *Proc. of Advances in Cryptology-CRYPTO '92*, Lecture Notes in Computer Science 740, Aug. 1992, pp. 113-138.

J. L. Abad-Peiro, et al., "Designing a Generic Payment Service," *IBM Research Division, Zurich Research Laboratory*, Nov. 1996, 26 pp.

R. Ankney, "A Certificate-Based Authorization Model," *Fisher International*, Sep. 25, 1995, 20 pp.

D. Chaum, et al., "Multiparty Unconditionally Secure Protocols," ACM-0-89791-264, 1988, pp. 11-19.

O. Goldreich, et al., "Proofs that Yield Nothing But Their Validity or All Languages in NP Have Zero-Knowledge Proof Systems," *Journal of the Association for Computing Machinery*, vol. 38, No. 1, Jul. 1999, pp. 691-729.

M. K. Franklin, et al., "Fair Exchange with a Semi-Trusted Third Party," *Proc. of the $4^{th}$ ACM Conference on Computer and Communications Security*, Apr. 1997, 6 pp.

A. Fiat, et al., "How to Prove Yourself: Practical Solutions to Identification and Signature Problems," *Proc. of Advances in Cryptology: Proc. Crypto '86*, Lecture Notes in Computer Science 263, 1987, pp. 186-194.

D. Dolev, et al., "Non-Malleable Cryptography," ACM 089791-397-3, 1991, pp. 542-552.

Richard A. DeMillo, et al., "Cryptology in Revolution: Mathematics and Models," *Lecture Notes Prepared for the American Mathematical Society Short Course Held in San Francisco, CA*, Jan. 5-6, 1981, ISBN 0-8218-0041-8, 1983, pp. 152-155.

Ivan Bjerre Damgdrd, "Payment Systems and Credential Mechanisms with Provable Security Against Abuse by Individuals," *Proc. Of Advances in Cryptology—CRYPTO '88*, 1988, pp. 328-335.

O. Goldreich, et al., "How to Play Any Mental Game or a Completeness Theorem for Protocols with Honest Majority," ACM 0-89791-221-7, 1987, pp. 218-229.

Y. Frankel, et al., "Indirect Discourse Proofs: Achieving Efficient Fair Off-Line E-Cash," *Proc. of Advances in Cryptology, ASIACRYPT '96*, Lecture Notes in Computer Science 1163, Springer Verlag, 1996, pp. 286-300.

S. Micali, "A Secure and Efficient Digital Signature Algorithm," *Technical Memo, Laboratory for Computer Science, Massachusetts Institute of Technology*, Cambridge, MA 02139, Mar. 1994, 12 pp.

"Initial EFF Analysis of Clinton Privacy and Security Proposal," *Society for Electronic Access, The Electronic Frontier Foundation*, Apr. 1993, 3 pp.

L. Lamport, "Password Authentication with Insecure Communication," *Communications of the ACM*, Technical Note Operating Systems, vol. 24, No. 11, Nov. 1981, pp. 770-772.

J. Linn, "Privacy Enhancement for Internet Electronic Mail: Part I—Message Encipherment and Authentication Procedures," *Network Working Group Request for Comments: 1040*, Jan. 1988, 28 pp.

S. Kent, "Privacy Enhancement for Internet Electronic Mail: Part II—Certificate-Based Key Managements," *Network Working Group Request for Comments: 1422*, Feb. 1993, 30 pp.

T. Elgamal, "A Public Key Cryptosystem and a Signature Scheme Based on Discrete Logarithms," *IEEE Transactions on Information Theory*, vol. IT-31, No. 4, Jul. 1985, pp. 469-472.

R. Hauser, et al., "Lowering Security Overhead in Link State Routing" *Computer Networks*, vol. 31, Elsevier, Apr. 1999, pp. 885-894.

S. Herda, "Non-repudiation: Constituting evidence and proof in digital cooperation," *Computer Standards & Interfaces*, vol. 17, Elsevier, 1995, pp. 69-79.

S.G. Stubblebine, "Recent-Secure Authentication: Enforcing Evocation in Distributed Systems, Security and Privacy," *Proc. of the 1995 IEEE Symposium on Security and Privacy*, Section 5, 1995, pp. 224-235.

Ronald L. Rivest and Adi Shamir, "PayWord and MicroMint: Two simple micropayment schemes," *MIT Laboratory for Computer Science 545 Technology Square*, Cambridge, Mass 02139; *Wezmann Institute of Sciince Applied Mathematics Department*, Rehovot, Israel, Apr. 27, 2001, 19 pp.

R. L. Rivest et al., "A Method for Obtaining Digital Signatures and Public-Key Cryptosystems," *Communications of the ACM*, Programming Techniques, vol. 21, No. 2, Feb. 1978, pp. 120-126.

M. Bellare, et al., "Incremental cryptography: the case of hashing and signing," *Proc. of Advances in Cryptology—CRYPTO '94*, Lecture Notes in Computer Science 839, Springer-Verlag, 1994, pp. 216-233.

M. Bellare and S. Micali, "How to Sign Given Any Trapdoor Permutation," *J. of the Assoc. for Computing Machinery*, vol. 39, No. 1, Jan. 1992, pp. 214-233.

J. C. Benaloh, "Secret Sharing Homomorphisms: Keeping Shares of a Secret Secret (Extended Abstract)," *Proc. of Advances in Cryptology—CRYPTO '86*, Lecture Notes in Computer Science 263, Springer-Verlag, 1986, pp. 216-233.

W. Johnston, et al., "Authorization and Attribute Certificates for Widely Distributed Access Control," *IEEE 7th International Workshops on Enabling Technologies: Infrastructure for Collaborative Enterprises*, 1998, 6 pp.

P. Janson and M. Waidner, "Electronic Payment over Open Networks," *IBM Zurich Research Laboratory*, Apr. 18, 1995, 9 pp.

E. D. Karnin, et al., "On Secret Sharing Systems," *IEEE Transactions on Information Theory*, vol. IT-29, No. 1, Jan. 1983, pp. 35-41.

S. Micali, and R. L. Rivest, R. L., "Micropayments Revisited," *Proc. of the the Cryptographer's Track At the RSA Conference on Topics in Cryptology* (Feb. 18-22, 2002), Lecture Notes in Computer Science 2271. Springer-Verlag, London, 2002, 149-163.

Silvio Micali, "Enhanced Certificate Revocation," *Technical Memo MIT/LCS/TM-542b, Laboratory for Computer Science*, Massachusetts Institute of Technology, Mar. 22, 1996, 10 pp.

R. Housley, et al., "Internet Public Key Infrastructure Part I: x.509 Certificate and CRL Profile," *Internet Engineering Task Force, PKIX Working Croup, Internet Draft*, Mar. 26, 1996, 76 pp.

T. Elgamal, et al., "Securing Communications on the Intranet and Over the Internet," White Paper, *Netscape Communications Corporation*, Jul. 1996, 19 pp.

S. Berkovits, et al., "Public Key Infrastructure Study," Final Report, *National Institute of Standards and Technology*, Gaithersburg,, MD, Apr. 1994, 193 pp.

M. Ben-Or, et al., "Completeness Theorems for Non-Cryptographic Fault-Tolerant Distributed Computation," ACM-0-89791-264, 1988, 10 pp.

M. Ben-Or, et al., "A Fair Protocol for Signing Contracts," *IEEE Transactions on Information Theory*, vol. 36, No. 1, Jan. 1990, pp. 40-46.

G. R. Blakley, "Safeguarding cryptographic keys," *AFIPS—Proc. of the National Computer Conference*, vol. 48, 1979, pp. 313-317.

J. Camenisch, et al., "An Efficient Fair Payment System," ACM-089791-892-0, 1996, 7 pp.

J. Camenisch, et al., "Digital Payment Systems with Passive Anonymity-Revoking Trustees," *Computer Security—ESORICS '96*, Lecure Notes in Computer Science 1146, Springer Verlag, 1996, pp. 33-43.

M. Blum, "How to Exchange (Secret) Keys," *ACM Transactions on Computer Systems*, vol. 1, No. 2, May 1983, pp. 175-193.

H. Bürk, et al., "Digital Payment Systems Enabling Security and Unobservability," *Computers & Security*, vol. 8, Elsevier Science, 1989, pp. 399-416.

G. Brassard, et al., "Minimum Disclosure Proofs of Knowledge," *J. of Computer and System Sciences*, vol. 37, 1988, pp. 156-189.

D. Chaum, et al., "Untraceable Electronic Cash," *Proc. of the 8th Annual international Cryptology Conference on Proc. of Advances in Cryptology* (Aug. 21-25, 1988), Lecture Notes in Computer Science 403, Springer-Verlag, 1990, pp. 319-327.

P. Cheng, et al., "Design and Implementation of Modular Key Management Protocol and IP Secure Tunnel on AIX," *IBM Thomas J. Watson Research Center*, Yorktown Heights, NY, 10598, Apr. 28, 1995, 14 pp.

R. DeMillo, et al., "Protocols for Data Security," *Computer, IEEE*, Feb. 1983, pp. 39-50.

E-mail from Martin Hellman, "Re: Clipper-Chip Escrow-System Flaws," Apr. 16, 1993, 1 p.

E-mail from Martin Hellman, "Clipper Chip," Apr. 17, 1993, 2 pp.

E-mail from Dorothy Denning, "Re: Clipper Chip," Apr. 18, 1993, 3 pp.

Y. Desmedt, et al., "Threshold cryptosystems," *Proc. of Advances in Cryptology—CRYPTO 89*, Lecture Notes in Computer Science 435, Springer-Verlag, 1990, pp. 307-315.

W. Diffie, et al., "New Directions in Cryptography," *IEEE Transactions on Information Theory*, vol. IT-22, Nov. 1976, pp. 644-654.

S. Dukach, "SNPP: A Simple Network Payment Protocol," *Proc. of the Eighth Annual Computer Security Applications Conference*, Dec. 1992, 6 pp.

S. Even, et al., "A Randomized Protocol for Signing Contracts," *Communications of the ACM, Programming Techniques and Data Structures*, vol. 28, No. 6, Jun. 1985, pp. 637-647.

S. Even, et al., "On-line/Off-line Digital Signatures," *Proc. of Advances in Cryptology*, Springer-Verlag New York, pp. 263-275.

S. Even, et al., "Secure Off-line Electronic Fund Transfer Between Nontrusting Parties," *Computer Science Department, Technion, Israel Institute of Technology*, Haifa, Israel 32000, Jan. 31, 1988, 10 pp.

O. Goldreich, et al., "Proofs that Yield Nothing But their Validity and a Methodology of Cryptographic Protocol Design," *Proc. of 27th Symp. on Foundation of Computer Science*, 1986, pp. 174-187.

P. Feldman, "A Practical Scheme for Non-interactive Verifiable Secret Sharing," *IEEE Symposium on Foundations of Computer Science*, 1987, pp. 427-437.

A. Fiat, "Batch RSA," *Proc. of Advances in Cryptology—CRYPTO '89*, Lecture Notes on Computer Science 435, Springer-Verlag, 1989, pp. 175-185.

S. Goldwasser, et al., "A Digital Signature Scheme Secure Against Adaptive Chosen-Message Attacks," *Society for Industrial and Applied Mathematics (SIAM) J. Comput.*, vol. 17, No. 2, Apr. 1988, pp. 281-308.

L. C. Guillou, et al., "A 'Paradoxical' Identity-Based Signature Scheme Resulting from Zero-Knowledge," *Proc. of Advances in Cryptology—CRYPTO '88*, Lecture Notes in Computer Sciences 403, Springer Verlag, New York, 1990, pp. 216-231.

K. E. B. Hickman, "The SSL Protocol," Internet Draft, *Netscape Communications Corporation*, Jun. 1995, 32 pp.

M. Jakobsson, "Reducing costs in identification protocols," *Department of Computer Science and Engineering*, University of California, San Diego, La Jolla, CA 92093, 1992, 7 pp.

G. B. Koleta, "Cryptographers Gather to Discuss Research: Analyses of how to break codes and new ways to use codes were featured at the meeting," *Science*, vol. 214, Nov. 6, 1981, pp. 646-647.

P. Janson, et al., "Electronic Payment Systems," *ACTS Project AC026, SEMPER*, May 1, 1996, pp. 24.

J. Kilian, et al., "Identify Escrow," *Proc. of Advances in Cryptology—CRYPTO '98*, 1998, 18 pp.

A. G. Konheim, "Chapter IX: Digital Signatures and Authentications," *Cryptography, A Primer*, John Wiley & Sons, 1981, pp. 331-347, 365-370.

H. Königs, "Cryptographic Identification Methods for Smart Cards in the Process of Standardization," *IEEE Communications Magazine*, Jun. 1991, pp. 42-47.

S. Low, et al., "Anonymous Credit Cards," *Proc. of the 2nd ACM Conference on Computer and Communications*, Fairfax, Virginia, 1994, 10 pp.

M. Luby, et al., "How to Simultaneously Exchange a Secret Bit by Flipping a Symmetrically-Biased Coin," *Proc. of the 24th IEEE Symposium on Foundations of Computer Science*, Tucson, Arizona, 1983, pp, 11-21.

J. Markoff, "New Communication System Stirs Talk of Privacy vs. Eavesdropping," *The New York Times*, Apr. 16, 1993, 2 pp.

J. Markoff, "Communications Plan Draws Mixed Reaction," *The New York Times*, Apr. 17, 1983, 1 pp.

Leighton and S. Micali, "New Approaches to Secret-Key Exchange," *Proc. of Advances in Cryptology—CRYPTO '93*, 1993, 10 pp.

A. J. Menezes, Handbook of Applied Cryptography, CRC Press, 1997, pp. 566, 576-577, 588-589, 706, 716, 720, 728-729, 737.

P. D. Merillat, "Secure stand Alone Positive Personnel Identify Verification System (SSA-PPIV)," Sandia Laboraties, SAND79-0070, Mar. 1979, 21 pp.

R. C. Merkle, "A Certified Digital Signature," *Communications of the ACM*, 1979, pp. 218-238.

R. C. Merkle, "A Digital Signature Based on a Conventional Encryption Function," *Presented at CRYPTO '87*, 1987, 8 pp.

C. H. Meyer and S. M. Matyas, "Chapter 8: Authentication Techniques Using Cryptography," *Cryptography: A New Dimension in Computer Data Security*, John Wiley & Sons, 1982, pp. 350-428.

S. Micali and A. Shamir, "An Improvement of the Fiat-Shamir Identification and Signature Scheme," *Presented at CRYPTO '88*, 1988, 5 pp.

S. Micali, "Guaranteed partial key escrow," *Technical Memo, MIT/LCS TM-537*, Sep. 1995, 13 pp.

S. Micali and A. Shamir, "Partial Key-Escrow," *MIT Laboratory for Computer Science, Cambridge, MA 02139 and Weizmann Institute Computer Science Department*, Rehovot, Israel, Feb. 1996, 13 pp.

S. Micali, "Fair Cryptosystems," *Technical Memo, MIT/LCS TM-579.b*, Nov. 1993, 36 pp.

Website pages @ http://www.valicert.com, Sep. 23, 2002, 8 pp.

T. P. Pedersen, "Electronic payments of small amounts," *Technical report, Aarhus University, Computer Science Department*, Aug. 1995, 12 pp.

T. P. Pedersen, "Distributed Provers with Applications to Undeniable Signatures," *Proc. of Advances in Cryptology—EUROCRYPT '91*, Lecture Notes in Computer Science 547, Springer-Verlag, 1991, pp. 221-242.

Donn B. Parker, "Chapter 43: Public Key Cryptosystems," *Fighting Computer Crime*, Charles Scribner's Sons, New York, 1983, pp. 327-334.

John Droge, "Mykotronx Develops New Chip to Protect Digital Data," Press Release, Mykotronx, Inc., Torrence, California, 1992, 3 pp.

Barbara Fox, "Certificate Revocation: Mechanics and Meaning," Microsoft Corporation, Introductory Remarks for Panel Discussion with J. Feigenbaum, P. Kocher, M. Myers and R. Rivest,, 1998, 8 pp.

David Mutch, "Electronics Industry Wants to Offer V-Chip of Its Own," *The Christian Science Monitor*, Sep. 25, 1995, 3 pp.

S. Micali and P. Rogaway, "Secure Computation," *Proc. of Advances in Cryptology: CRYPTO '91*, Lecture Notes in Computer Science 576, Springer, 1991, pp. 392-404.

C. Mueller-Scholor and N. R. Wagner, "The implementation of a cryptography-based secure office system," *AFIPS Proc. of the National Computer Conference*, 1982, pp. 487-492.

M. Noar and M. Yung, "Universal One-Way Hash Function and their Cryptographic Applications," ACM 0-89791-307-8, 1989, pp. 33-43.

R. M. Needham and M. D. Schroeder, "Using Encryption for Authentication in Large Networks of Computers," *Communications of the ACM, Operating Systems*, vol. 21, No. 12, Dec. 1978, pp. 993-999.

H. Ong and C.P. Schnorr, "Fast Signature Generation with a Fiat-Shamir-Like Scheme," *Proc. of Advances in Cryptology—EUROCRYPT '90*, Lecture Notes in Computer Science 473, Springer-Verlag, 1991, pp. 432-440.

M. O. Rabin, "Digitalized Signatures and Public-Key Functions as Intractable as Factorization," Technical Report, MIT/LCS/TR-212, Jan. 1979, 17 pp.

T. Rabin and M. Ben-Or, "Verifiable Secret Sharing and Multiparty Protocols with Honest Majority," ACM 0-89791-307-8, 1989, pp. 73-85.

M. O. Rabin, "Transaction Protection by Beacons," Harvard University Center for Research in Computing Technology, TR-29-81, Nov. 1981, 21 pp.

Michael O. Rabin, "How to Exchange Secrets," May 20, 1981, 21 pp.

E. Rescorla and A. Schiffman, "The Secure HyperText Transfer Protocol," Internet Draft, *Web Transaction Security Working Group, Enterprise Integration Technologies*, Jul. 1995, 36 pp.

K. Rihaczek, "Teletrust," *Computer Networks and ISDN Systems*, vol. 13, 1987, pp. 235-239.

"Statement by the Press Secretary," *The White House, Office of the Press Secretary*, Apr. 16, 1993. 6 pp.

C. P. Schnorr, "Efficient Identification and Signatures for Smart Cards," *Proc. of Advances in Cryptology—Crypto 89*, G. Brassard (ed.), Lecture Notes in Computer Science 435, Springer-Verlag, 1990, pp. 239-251.

J. M. Blachere and M. Waidner, "SEMPER," *Project AC026*, Document 43IZR031, 1995, 46 pp.

Bob Serenelli and Tim Leisher, "Securing Electronic Mail Systems," *Communications—Fusing Command, Control and Intelligence, MILCOM '92*, Conference Record, vol. 2, 1992, pp. 677-680.

A. Shamir, "How to Share a Secret," *Programming Techniques, Communications of the ACM*, vol. 22, No. 11, Nov. 1979, pp. 612-613.

A. Shamir, "Identity-based cryptosystems and signature schemes," *Proc. of Advances in Cryptology, CRYPTO 84*, G. R. Blakley and D. Chaum (Eds.), Springer-Verlag, 1985, pp. 47-53.

*Contemporary Cryptology*, G. J. Simmons (Ed.), IEEE Press, New York, 1991, pp. 348-350, 617-630.

G. J. Simmons, "How to (Really) Share a Secret," *Proc. of Advances in Cryptology—Crypto 88*, S. Goldwasser (ed.), Lecture Notes in Computer Science 403, Springer-Verlag, 1988, pp. 390-448.

G. J. Simmons, "An Impersonation-Proof Identify Verification Scheme," *Proc. of Advances in Cryptology—Crypto 87*, C. Pomerance (Ed.), Lecture Notes in Computer Science 293, Springer-Verlag, 1987, pp. 211-215.

G. J. Simmons, "A Protocol to Provide Verifiable Proof of Identity and Unforgeable Transaction Receipts," IEEE Journal on Selected Areas in Communications, vol. 7, No. 4, May 1989, pp. 435-447.

G. J. Simmons, "Scanning the Issue," and "How to Insure that Data Acquired to Verify Treaty Compliance are Trustworthy," *Proc. of the IEEE*, vol. 76, No. 5, May 1988, pp. 515-518 and 621-627.

G. J. Simmons, "A System for Verifying User Identity and Authorization at the Point-of Sale or Access," Cryptologia, vol. 8, No. 1, Jan. 1984, 21 pp.

G. J. Simmons and G. B. Purdy, "Zero-Knowledge Proofs of Identity and Veracity of Transaction Receipts," *Proc. of Advances in Cryptology—Eurocrypt '88*, Lecture Notes in Computer Science 330, C. G. Günther (Ed.), Springer-Verlag New York, 1988, pp. 35-49.

M. Sirbu and J. D. Tygar, "NetBill: An Internet Commerce System Optimized for Network Delivered Services," *IEEE Personal Communications*, Aug. 1995, 13 pp.

J. L. Snare, "Secure Electronic Data Interchange," *Computer Security in the Age of Information*, W. J. Caelli (Ed.), Elsevier Science Publishers B.V., 1989, pp. 331-342.

K. R. Sollins, "Cascaded Authentication," *Proc. of the 1988 IEEE Symposium on Security and Privacy*, 1988, pp. 156-163.

M. Stadler, et al., "Fair Blind Signatures," *Proc. of Advances in Cryptology—Eurocrypt '95*, Lecture Notes in Computer Science 921, Springer-Verlag, 1995, pp. 209-219.

L. H. Stein, et al., "The Green Commerce Model," Internet Draft, Oct. 1994, 18 pp.

G. Tsudik, "Zurich iKP Prototype (ZiP): Protocol Specification Document," *IBM Zurich Research Lab*, Mar. 5, 1996, 30 pp.

V. Varadharajan and S. Black, "Formal Specification of a Secure Distributed Messaging System," *Proc. of the $12^{th}$ National Computer Security Conference*, Oct. 1989, pp. 146-171.

M. Waidner, "Development of a Secure Electronic Marketplace for Europe," *Proc. of ESORICS 96*, Rome, Sep. 1996, 15 pp.

M. Wegman, "One-Time Pad Digitial Signature Technique," *IBM Technical Disclosure Bulletin*, vol. 21, No. 3, Aug. 1978, pp. 1316-1318.

H. C. Williams, "A Modification of the RSA Public-Key Encryption Procedure," *IEEE Transactions on Information Theory*, vol. IT-26, No. 6, Nov. 1980, pp. 726-729.

A. C. Yao, "Protocols for Secure Computations," *Proc. of the 23rd Symp. on Foundation of Computer Science*, IEEE, 1982, pp. 160-164.

J. Zhou and D. Gollman, "A Fair Non-repudiation Protocol," *Proc. of the 1996 IEEE Symposium on Security and Privacy*, 1996, pp. 55-61.

\* cited by examiner

LOGGING ACCESS ATTEMPTS TO AN AREA

CROSS-REFERENCE TO RELATED APPLICATIONS

This application claims priority to U.S. provisional patent application No. 60/488,645 filed on Jul. 18, 2003, which is incorporated by reference herein, and claims priority to U.S. provisional patent application No. 60/505,640 filed on Sep. 24, 2003, which is incorporated by reference herein.

BACKGROUND OF THE INVENTION

1. Technical Field

This application relates to the field of physical access control, and more particularly to the field of physical access control using processor actuated locks and related data.

2. Description of Related Art

Ensuring that only authorized individuals can access protected areas and devices may be important in many instances, such as in the case of access to an airport, military installation, office building, etc. Traditional doors and walls may be used for protection of sensitive areas, but doors with traditional locks and keys may be cumbersome to manage in a setting with many users. For instance, once an employee is fired, it may be difficult to retrieve the physical keys the former employee was issued while employed. Moreover, there may be a danger that copies of such keys were made and never surrendered.

Smart doors provide access control. In some instances, a smart door may be equipped with a key pad through which a user enters his/her PIN or password. The key pad may have an attached memory and/or elementary processor in which a list of valid PINs/passwords may be stored. Thus, a door may check whether the currently entered PIN belongs to the currently valid list. If so, the door may open. Otherwise, the door may remain locked. Of course, rather than (solely) relying on traditional keys or simple key pads, a more modern smart door may work with cards (such as smart cards and magnetic-strip cards) or contactless devices (e.g., PDA'a, cell phones, etc.). Such cards or devices may be used in addition to or instead of traditional keys or electronic key pads. Such magnetic-strip cards, smart cards or contactless devices, designed to be carried by users, may have the capability of storing information that is transmitted to the doors. More advanced cards may also have the ability of computing and communicating. Corresponding devices on the doors may be able to read information from the cards, and perhaps engage in interactive protocols with the cards, communicate with computers, etc.

An aspect of a door is its connectivity level. A fully connected door is one that is at all times connected with some database (or other computer system). For instance, the database may contain information about the currently valid cards, users, PINs, etc. In some instances, to prevent an enemy from altering the information flowing to the door, such connection is secured (e.g., by running the wire from the door to the database within a steel pipe). On the other hand, a totally disconnected door does not communicate outside of its immediate vicinity. In between these two extremes, there may be doors that have intermittent connectivity (e.g., a wirelessly connected "moving" door that can communicate with the outside only when within range of a ground station, such as the door of an airplane or a truck).

Traditional access control mechanisms suffer from many drawbacks. Fully connected doors may be very expensive. The cost of running a secure pipe to a distant smart door may vastly exceed the cost of the smart door itself. Protecting a wire cryptographically, while possibly cheaper, still has its own costs (e.g., those of protecting and managing cryptographic keys). Moreover, cryptography without steel pipes and security guards cannot prevent a wire from being cut, in which case the no-longer-connected door may be forced to choose between two extreme alternatives: namely, remaining always closed or always open, neither of which may be desirable. In any case, fully connecting a door is often not a viable option. (For instance, the door of a cargo container below sea level in the middle of the Atlantic Ocean is for all practical purposes totally disconnected.)

Disconnected smart doors may be cheaper than connected doors. However, traditional approaches to smart doors have their own problem. Consider, for instance, a disconnected smart door capable of recognizing a PIN. A terminated employee may no longer be authorized to go trough that door; yet, if he still remembers his own PIN, he may have no trouble opening such an elementary smart door. Therefore, it would be necessary to "deprogram" the PINs of terminated employees, which is difficult for disconnected doors. Indeed, such a procedure may be very cumbersome and costly: an airport facility may have hundreds of doors, and dispatching a special team of workers to go out and deprogram all of such doors whenever an employee leaves or is terminated may be too impractical.

It is desirable to provide a level of security associated with fully connected doors without incurring the additional costs thereof. As demonstrated, disconnected smart doors and cards do not by themselves guarantee the security, convenience and low cost of the access-control system.

SUMMARY OF THE INVENTION

According to the present invention, controlling access includes providing a barrier to access that includes a controller that selectively allows access, at least one administration entity generating credentials/proofs, wherein no valid proofs are determinable given only the credentials and values for expired proofs, the controller receiving the credentials/proofs, the controller determining if access is presently authorized, and, if access is presently authorized, the controller allowing access. The credentials/proofs may be in one part or may be in separate parts. There may be a first administration entity that generates the credentials and other administration entities that generate proofs. The first administration entity may also generate proofs or the first administration entity may not generate proofs. The credentials may correspond to a digital certificate that includes a final value that is a result of applying a one way function to a first one of the proofs. Each of the proofs may be a result of applying a one way function to a future one of the proofs. The digital certificate may include an identifier for the electronic device. The credentials may include a final value that is a result of applying a one way function to a first one of the proofs. Each of the proofs may be a result of applying a one way function to a future one of the proofs. The credentials may include an identifier for a user requesting access. The credentials/proofs may include a digital signature. The barrier to access may include walls and a door. Controlling access may also include providing a door lock coupled to the controller, wherein the controller allowing access includes the controller actuating the door lock to allow the door to open. Controlling access may also include providing a reader coupled to the controller, wherein the controller receives credentials/proofs from the reader. The credentials/proofs may be provided on a smart card presented by a user. Controlling access may also include providing an external connection to the controller. The external connection may be intermittent. The controller may receive at least a portion of the credentials/proofs using the external connection or the controller may receive all of the credentials/proofs using the external connection. Controlling access may also include providing a reader coupled to the controller, where the controller receives a remaining portion of the credentials/proofs from the reader. The credentials/proofs may be provided on a smart card presented by a user. The credentials/proofs may include a password entered by a user. The credentials/proofs may include user biometric information. The credentials/proofs may include a handwritten signature. The credentials/proofs may include a secret value provided on a card held by a user. The credentials/proofs may expire at a predetermined time.

According further to the present invention, an entity controlling access of a plurality of users to at least one disconnected door includes mapping the plurality of users to a group, for each time interval d of a sequence of dates, having an authority produce a digital signature SIGUDd, indicating that members of the group can access door during time interval d, causing at least one of the members of the group to receive SIGUDd during time interval d for presentation to the door in order to pass therethrough, having the at least one member of the group present SIGUDd to the door D, and having the door open after verifying that (i) SIGUDd is a digital signature of the authority indicating that members of the group can access the door at time interval d, and (ii) that the current time is within time interval d. The at least one member of the group may have a user card and the door may have a card reader coupled to an electromechanical lock, and the at least one member of the group may receive SIGUDd by storing it into the user card, and may present SIGUDd to the door by having the user card read by the card reader. The authority may cause SIGUDd to be received by the at least one member of the group during time interval d by posting SIGUDd into a database accessible by the at least one member of the group. SIGUDd may be a public-key signature, and the door may store the public-key of the authority. The door may also verify identity information about the at least one member of the group. The identity information about the at least one member of the group may include at least one of: a PIN and the answer to a challenge of the door.

According further to the present invention, controlling physical access also includes assigning real time credentials to a group of users, reviewing the real time credentials, where the real time credentials include a first part that is fixed and a second part that is modified on a periodic basis, where the second part provides a proof that the real time credentials are current, verifying validity of the real time credentials by performing an operation on the first part and comparing the result to the second part; and allowing physical access to members of the group only if the real time credentials are verified as valid. The first part may be digitally signed by an authority. The authority may provide the second part. The second part may be provided by an entity other than the authority. The real time credentials may be provided on a smart card. Members of the group may obtain the second part of the real time credentials at a first location. Members of the group may be allowed access to a second location different and separate from the first location. At least a portion of the first part of the real time credentials may represent a one-way hash applied a plurality of times to a portion of the second portion of the real time credentials. The plurality of times may correspond to an amount of time elapsed since the first part of the real time credentials were issued. Controlling physical access may also include controlling access through a door.

According further to the present invention, determining access includes determining if particular credentials/proofs indicate that access is allowed, determining if there is additional data associated with the credentials/proofs, wherein the additional data is separate from the credentials/proofs, and, if the particular credentials/proofs indicate that access is allowed and if there is additional data associated with the particular credentials/proofs, then deciding whether to deny access according to information provided by the additional data. The credentials/proofs may be in one part or in separate parts. There may be a first administration entity that generates the credentials and other administration entities that generate proofs. The first administration entity may also generate proofs or may not generate proofs. The credentials may correspond to a digital certificate that includes a final value that is a result of applying a one way function- to a first one of the proofs. Each of the proofs may be a result of applying a one way function to a future one of the proofs. The digital certificate may include an identifier for the electronic device. The credentials may include a final value that is a result of applying a one way function to a first one of the proofs. Each of the proofs may be a result of applying a one way function to a future one of the proofs. The credentials may include an identifier for a user requesting access. The credentials/proofs may include a digital signature. Access may be access to an area enclosed by walls and a door. Determining access may include providing a door lock, wherein the door lock is actuated according to whether access is being denied. Determining access may also include providing a reader that receives credentials/proofs. The credentials/proofs may be provided on a smart card presented by a user. The credentials/proofs may include a password entered by a user. The credentials/proofs may include user biometric information. The credentials/proofs may include a handwritten signature. The credentials/proofs may include a secret value provided on a card held by a user. The credentials/proofs may expire at a predetermined time. The additional data may be digitally signed. The additional data may be a message that is bound to the credentials/proofs. The message may identify the particular credentials/proofs and include an indication of whether the particular credentials/proofs have been revoked. The indication may be the empty string. The additional data may include a date. The additional data may be a message containing information about the particular credentials/proofs and containing information about one or more other credentials/proofs. Determining access may also include storing the additional data. The additional data may include an expiration time indicating how long the additional data is to be saved. The expiration time may correspond to an expiration of the particular credentials/proofs. Determining access may also include storing the additional data for a predetermined amount of time. Credentials/proofs may all expire after the predetermined amount of time. The additional data may be provided using a smart card. The smart card may be presented by a user attempting to gain access to an area. Access to the area may be restricted using walls and at least one door. The additional data may be for a user different from the user attempting to gain access. Determining access may also include providing a communication link and transmitting the additional data using the communication link. The communication link may be provided the additional data by a smart card. The smart card may require periodic communication with the communication link in order to remain operative. The smart card may be provided with the additional data by another smart card. The additional data may be selectively provided to a subset of smart cards. Determining access may also include providing a priority level to the additional data. The additional data may be selectively provided to a subset of smart cards according to the priority level provided to the additional data. The additional data may be randomly provided to a subset of smart cards.

According further to the present invention, issuing and disseminating a data about a credential includes having an entity issue authenticated data indicating that the credential has been revoked, causing the authenticated data to be stored in a first card of a first user, utilizing the first card for transferring the authenticated data to a first door, having the first door store information about the authenticated data, and having the first door rely on information about the authenticated data to deny access to the credential. The authenticated data may be authenticated by a digital signature and the first door may verify the digital signature. The digital signature may be a public-key digital signature. The public key for the digital signature may be associated with the credential. The digital signature may be a private-key digital signature. The credential and the first card may both belong to the first user. The credential may be stored in a second card different from the first card, and the first door may rely on information about the authenticated data by retrieving such information from storage. The credential may belong to a second user different from the first user. The authenticated data may be first stored in at least one other card different from the first card and the authenticated data may be transferred from the at least one other card to the first card. The authenticated data may be transferred from the at least one other card to the first card by first being transferred to at least one other door different from the first door. The entity may cause the authenticated data to be stored in the first card by first causing the authenticated data to be stored on a responder and then having the first card obtain the authenticated data from the responder. The responder may be unprotected. The first door may receive information about the authenticated data from the first card by the authenticated data first being transferred to at least one other card different from the first card. The at least one other card may receive information about the authenticated data from the first card by the authenticated data first being transferred to at least one other door different from the first door. The first door may be totally disconnected or may be intermittently connected.

According further to the present invention, a first door receives authenticated data about a credential of a first user, the process including receiving the authenticated data from a first card belonging to a second user different than the first user, storing information about the authenticated data, receiving the credential, and relying on the stored information about the authenticated data to deny access to the credential. The authenticated data may be authenticated by a digital signature and the first door verifies the digital signature. The digital signature may be a public-key digital signature. The public key for the digital signature may be associated with the credential. The digital signature may be a private-key digital signature. The authenticated data may be stored in the first card by being first stored in at least one other card and then transferred from the at least one other card to the first card. The authenticated data may be transferred from the at least one other card to the first card by first being transferred to at least one door different from the first door. The authenticated data may be stored in the first card by first being stored on a responder and then obtained by the first card from the responder. The responder may be unprotected. The first door may receive information about the authenticated data from the first card by the authenticated data first being transferred to at least one other card different from the first card. The at least one other card may receive information about the authenticated data from the first card by the authenticated data first being transferred to at least one other door different from the first door. The first door may be totally disconnected or may be intermittently connected.

According further to the present invention, assisting in an immediate revocation of access includes receiving authenticated data about a credential, storing information about the authenticated data on a first card, and causing a first door to receive information about the authenticated data. The authenticated data may be authenticated by a digital signature. The digital signature may be a public-key digital signature. The public key for the digital signature may be associated with the credential. The digital signature may be a private-key digital signature. The credential and the card may both belong to a first user. The first card may become unusable for access if the first card fails to receive a prespecified type of signal in a prespecified amount of time. The credential may belong to an other user different from the first user. The authenticated data may be received by the first card by being first stored in at least one other card different from the first card and then transferred from the at least one other card to the first card. The authenticated data may be transferred from the at least one other card to the first card by first being transferred to at least one other door different from the first door. The first card may obtain the authenticated data from a responder. The responder may be unprotected. The first card may cause the first door to receive information about the authenticated data by first transferring the authenticated data to at least one other card different from the first card. The first card may cause the at least one other card to receive information about the authenticated data by first transferring the authenticated data to at least one other door different from the first door. The first door may be totally disconnected or may be intermittently connected. The first card may eventually remove the stored information about the authenticated data from storage. The credential may have an expiration date, and first card may remove the stored information about the authenticated data from storage after the credential expires. The expiration date of the credential may be inferred from information specified within the credential.

According further to the present invention, logging events associated with accessing an area includes recording an event associated with accessing the area to provide an event recording and authenticating at least the event recording to provide an authenticated recording. Recording an event may include recording a time of the event. Recording an event may include recording a type of event. The event may be an attempt to access the area. Recording an event may include recording credentials/proofs used in connection with the attempt to access the area. Recording an event may include recording a result of the attempt. Recording an event may include recording the existence of data other than the credentials/proofs indicating that access should be denied. Recording an event may include recording additional data related to the area. Authenticating the recording may include digitally signing the recording. Authenticating at least the event recording may include authenticating the event recording and authenticating other event recordings to provide a single authenticated recording. The single authenticated recording may be stored on a card. The authenticated recording may be stored on a card. The card may have an other authenticated recording stored thereon. The other authenticated recording may be provided by the card in connection with the card being used to access the area. Access may be denied if the other authenticated recording may not be verified. A controller may be provided in connection with accessing the area and where the controller further authenticates the other authenticated recording. The other authenticated recording may be authenticated using a digital certificate. Logging events may also include a user presenting a card to attempt to access the area. Logging events may also include the card further authenticating the authenticated recording in connection with the user attempting to access the area. A controller may be provided in connection with accessing the area and wherein the controller and the card together further authenticate the authenticated recording. Logging events may include providing correlation generation data that indicates the contents of the authenticated recording. The correlation generation data may be bound to the authenticated recording. The correlation generation data may be bound to the authenticated recording and the resulting binding may be authenticated. The resulting binding may be digitally signed. The correlation generation data may be a sequence of numbers and a particular one of the numbers may be assigned to the event. Logging events may also include authenticating a binding of the particular number and the event. Authenticating the binding may include digitally signing the binding. Authenticating the binding may include one way hashing the binding and then digitally signing the result thereof. Correlation generation data for the event may include information identifying an other event. The other event may be a previous event. The other event may be a future event. Logging events may also include associating a first and second random value for the event, associating at least one of the first and second random values with the other event, and binding at least one of the first and second values to the other event. Providing correlation generation data may include using a polynomial to generate the correlation information. Providing correlation generation data may include using a hash chain to generate the correlation information. The correlation generation data may include information about a plurality of other events. The correlation generation data may include error correction codes. Logging events may also include disseminating the authenticated recording. Disseminating the authenticated recording may include providing the authenticated recording on cards presented by users attempting to access the area. The area may be defined by walls and a door.

According further to the present invention, at least one administration entity controls access to an electronic device by the at least one administration entity generating credentials and a plurality of corresponding proofs for the electronic device, wherein no valid proofs are determinable given only the credentials and values for expired proofs, the electronic device receiving the credentials, if access is authorized at a particular time, the electronic device receiving a proof corresponding to the particular time, and the electronic device confirming the proof using the credentials. The at least one administration entity may generate proofs after generating the credentials. A single administration entity may generate the credentials and generate the proofs. There may be a first administration entity that generates the credentials and other administration entities that generate proofs. The first administration entity may also generate proofs or may not. The credentials may be a digital certificate that includes a final value that is a result of applying a one way function to a first one of the proofs. Each of the proofs may be a result of applying a one way function to of a future one of the proofs. The digital certificate may include an identifier for the electronic device. The credentials may include a final value that is a result of applying a one way function to a first one of the proofs. Each of the proofs may be a result of applying a one way function to a future one of the proofs. The credentials may include an identifier for the electronic device. The electronic device may be a computer, which may boot up only if access is authorized. The electronic device may be a disk drive. At least one administration entity controlling access to an electronic device may include providing proofs using at least one proof distribution entity separate from the at least one administrative entity. There may be a single proof distribution entity or a plurality of proof distribution entities. At least one administration entity controlling access to an electronic device may include providing proofs using a connection to the electronic device. The connection may be the Internet. At least some of the proofs may be stored locally on the electronic device. At least one administration entity controlling access to an electronic device may include, if the proof corresponding to the time is not available locally, the electronic device requesting the proofs via an eternal connection. Each of the proofs may be associated with a particular time interval. After a particular time interval associated with a particular one of the proofs has passed, the electronic device may receive a new proof. The time interval may be one day.

According further to the present invention, an electronic device controls access thereto by receiving credentials and at least one of a plurality of corresponding proofs for the electronic device, wherein no valid proofs are determinable given only the credentials and values for expired proofs and testing the at least one of a plurality of proofs using the credentials. The credentials may be a digital certificate that includes a final value that is a result of applying a one way function to a first one of the proofs. Each of the proofs may be a result of applying a one way function to a future one of the proofs. The digital certificate may include an identifier for the electronic device. The credentials may include a final value that is a result of applying a one way function to a first one of the proofs. Each of the proofs may be a result of applying a one way function to a future one of the proofs. The credentials may include an identifier for the electronic device. The electronic device may be a computer. An electronic device controlling access thereto may also include the computer booting up only if access is authorized. The electronic device may be a disk drive. An electronic device controlling access thereto may also include obtaining proofs using a connection to the electronic device. The connection may be the Internet. At least some of the proofs may be stored locally on the electronic device. An electronic device controlling access thereto may also include, if the proof corresponding to the time is not available locally, the electronic device requesting the proofs via an external connection. Each of the proofs may be associated with a particular time interval. After a particular time interval associated with a particular one of the proofs has passed, the electronic device may receive a new proof. The time interval may be one day.

According further to the present invention, controlling access to an electronic device includes providing credentials to the electronic device and, if access is allowed at a particular time, providing a proof to the electronic device corresponding to the particular time, wherein the proof is not determinable given only the credentials and values for expired proofs. The credentials may be a digital certificate that includes a final value that is a result of applying a one way function to a first one of the proofs. Each of the proofs may be a result of applying a one way function to a future one of the proofs. The digital certificate may include an identifier for the electronic device. The credentials may include a final value that is a result of applying a one way function to a first one of the proofs. Each of the proofs may be a result of applying a one way function to a future one of the proofs. The credentials may include an identifier for the electronic device. The electronic device may be a computer. Controlling access to an electronic device may include the computer booting up only if access is authorized. The electronic device may be a disk drive. Controlling access to an electronic device may include providing proofs using at least one proof distribution entity separate from the at least one administrative entity. There may be a single proof distribution entity. There may be a plurality of proof distribution entities. Controlling access to an electronic device may include providing proofs using a connection to the electronic device. The connection may be the Internet. At least some of the proofs may be stored locally on the electronic device. Controlling access to an electronic device may include, if the proof corresponding to the time is not available locally, the electronic device requesting the proofs via an external connection. Each of the proofs may be associated with a particular time interval. After a particular time interval associated with a particular one of the proofs has passed, the electronic device may receive a new proof. The time interval may be one day.

DETAILED DESCRIPTION OF VARIOUS EMBODIMENTS

Figure 1A:
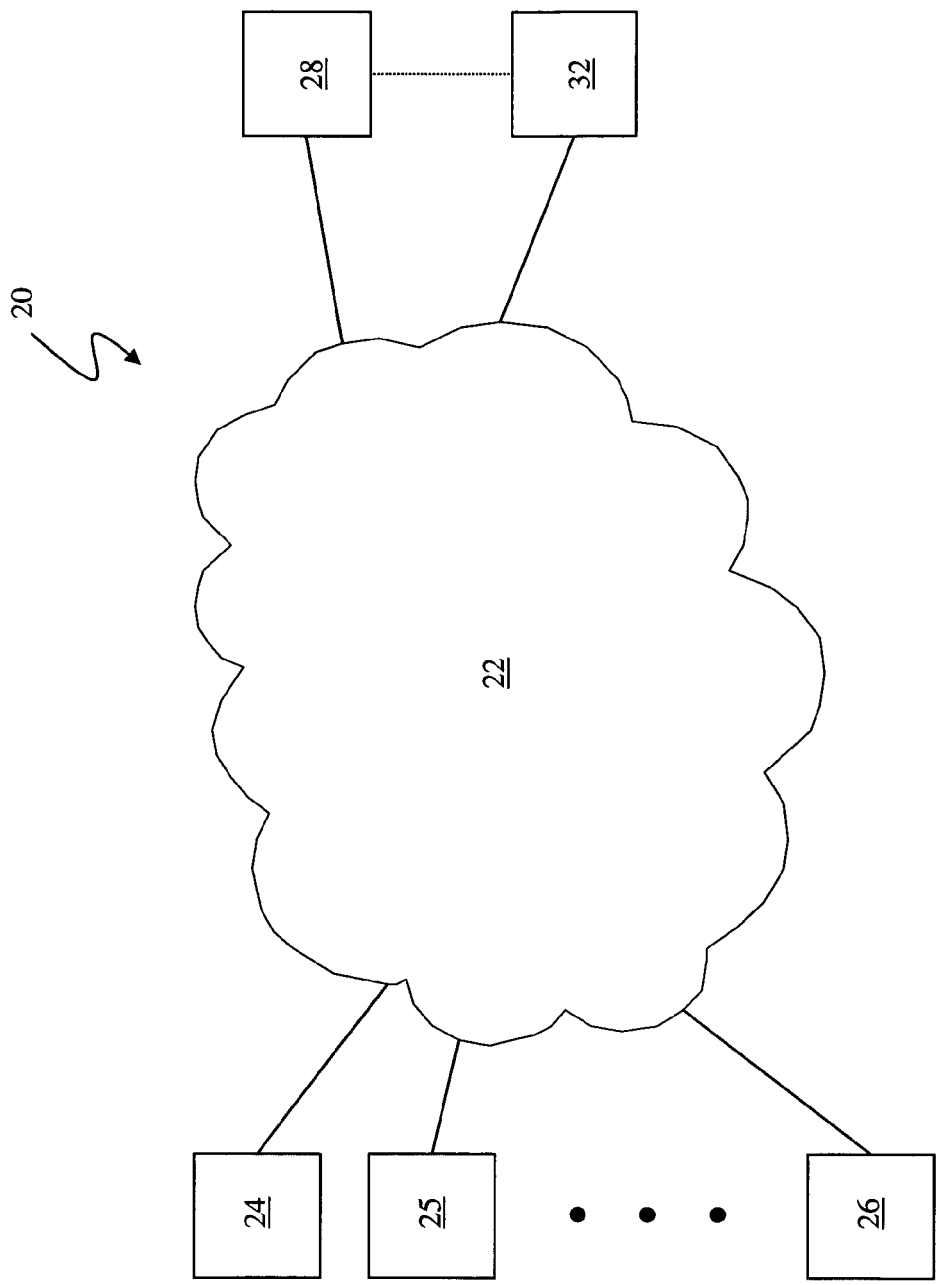
FIG. 1A is a diagram illustrating an embodiment that includes a connection, a plurality of electronic devices, an administration entity, and a proof distribution entity according to the system described herein.

Referring to FIG. 1A, a diagram 20 illustrates a general connection 22 having a plurality of electronic devices 24-26 coupled thereto. Although the diagram 20 shows three electronic devices 24-26, the system described herein may work with any number of electronic devices. The connection 22 may be implemented by a direct electronic data connection, a connection through telephone lines, a LAN, a WAN, the Internet, a virtual private network, or any other mechanism for providing data communication. The electronic devices 24-26 may represent one or more laptop computers, desktop computers (in an office or at an employees home or other location), PDA's, cellular telephones, disk drives, mass storage devices, or any other electronic devices in which it may be useful to restrict access thereto. In an embodiment herein, the electronic devices 24-26 represent desktop or laptop computers that are used by employees of an organization that wishes to restrict access thereto in case a user/employee leaves the organization and/or one of the computers is lost or stolen. Of course, there may be other reasons to restrict access to one or more of the electronic devices 24-26 and the system described herein may be used in connection with any appropriate implementation.

An administration entity 28 sets a policy for allowing access by users to the electronic devices 24-26. For example, the administration entity 28 may determine that a particular user, U1, may no longer have access to any of the electronic devices 24-26 while another user U2, may access the electronic device 24 but not to the other electronic devices 25, 26. The administrative entity 28 may use any policy for setting user access.

The administrative entity 28 provides a plurality of proofs that are transmitted to the electronic devices 24-26 via the connection 22. The proofs may be provided to the electronic devices 24-26 by other means, which are discussed in more detail below. The electronic devices 24-26 receive the distributed proofs and, using credentials stored internally (described in more detail elsewhere herein), determine if access thereto should be allowed. Optionally, a proof distribution entity 32 may also be coupled to the connection 22 and to the administration entity 28. The proof distribution entity 32 provides proofs to the electronic devices 24-26. In an embodiment herein, a proof would only be effective for one user and one of the electronic devices 24-26 and, optionally, only for a certain date or range of dates.

The proofs may be provided using a mechanism like that disclosed in U.S. Pat. No. 5,666,416, which is incorporated by reference herein, where each of the electronic devices 24-26 receives, as credentials, a digital certificate signed by the administrative entity 28 (or other authorized entity) where the digital certificate contains a special value representing an initial value having a one way function applied thereto N times. At each new time interval, the electronic devices may be presented with a proof that consists of a one of the values in the set of N values obtained by the applying the one way function. In such a case, the electronic devices 24-26 may confirm that the proof is legitimate by applying the one way function a number of times to obtain the special value provided in the digital certificate. This and other possible mechanisms are described in more detail elsewhere herein.

It is also possible to use one or more of the products provided by CoreStreet, Ltd. of Cambridge, Mass. to provide the appropriate credentials and proofs as set forth herein or use any other mechanism for generating unique proofs that 1) could only have been generated by an administrative authority (absent an administrative security breach); and 2) can not be used to generate any other proofs. Accordingly, the proofs are such that, given a legitimate proof P1, an unauthorized user may not generate another seemingly legitimate proof P2 for a different purpose (e.g., for a different time interval, different device, etc.). Thus, issued proofs may be stored and distributed in an unsecure manner, which substantially reduces the costs associated with the system. Of course, it is advantageous to maintain proper security for the entity or entities that generate the credentials and/or proofs as well as maintaining appropriate security for any unissued (e.g., future) proofs.

In addition, an unauthorized user in possession of legitimate proofs P1-PN may not generate a new proof PN+1. This is advantageous in a number of instances. For example, a terminated employee may not himself generate new proofs to provide unauthorized access to his corporate laptop after termination even though he is still in possession of all of the previous legitimate proofs he used for the laptop while he was still employed by the corporation.

In an embodiment herein, the electronic devices 24-26 are computers having firmware and/or operating system software that performs the processing described herein where the proofs are used to prevent unauthorized login and/or access thereto. Upon booting up and/or after a sufficient amount of time has passed, the computers would require an appropriate proof in order to operate. In this embodiment, functionality described herein may be integrated with the standard Windows login system (as well as BIOS or PXE environments). The administration entity 28 may be integrated with the normal user-administration tools of corporate Microsoft networks and to allow administrators to set login policies for each user. In many cases, the administration entity 28 may be able to derive all needed information from existing administrative information making this new functionality almost transparent to the administrator and reducing training and adoption costs. The administration entity 28 may run within a corporate network or be hosted as an ASP model by a laptop manufacturer, BIOS maker or other trusted partner. The proof distribution entity 32 may run partially within the corporate network and partially at a global site. Since proofs are not sensitive information, globally-accessible repositories of the proof distribution system may run as web services, thereby making the proofs available to users outside of their corporate networks.

In an embodiment herein, each of the computers would require a new proof each day. However, it will be appreciated by one of ordinary skill in the art that the time increment may be changed so that, for example, the computers may require a new proof every week or require a new proof every hour.

In addition, it is also possible to take advantage of a little-used feature of IDE hard drives which allows setting of a password on a drive which must be presented to the drive before it will spin up and allow access to the contents. If the firmware for the drive were modified to use the system described herein, it is possible that access to a hard drive may be restricted so that, for example, it would not be possible to gain access to a computer hard drive even by placing it in a different computer. This feature may be implemented with other types of hard drives.

In other implementations, the system may be used in connection with accessing data files, physical storage volumes, logical volumes, etc. In some instances, such as restricting access to files, it may be useful to provide appropriate modifications to the corresponding operating system.

Figure 1B:
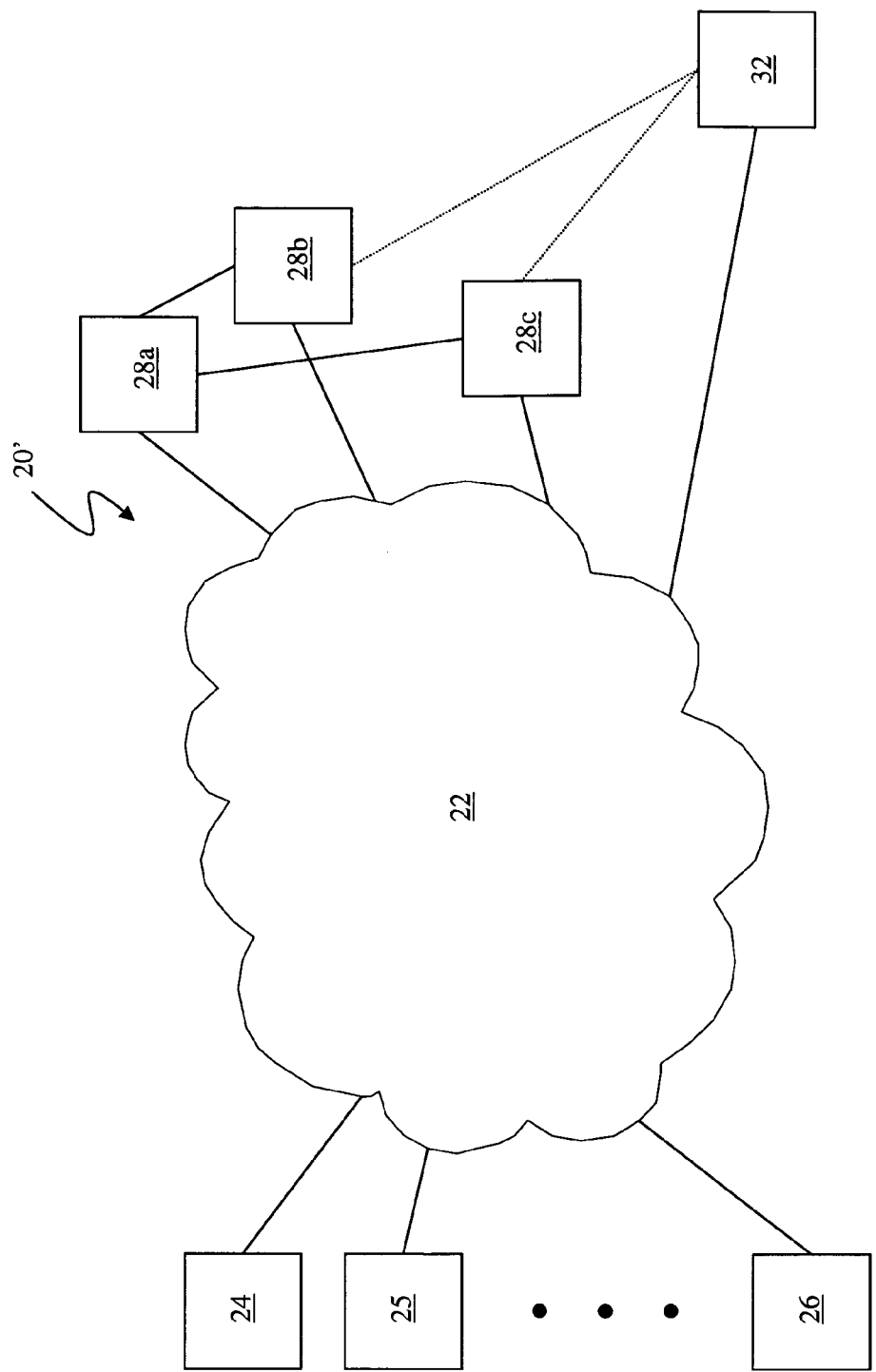
FIG. 1B is a diagram illustrating an alternative embodiment that includes a connection, a plurality of electronic devices, an administration entity, and a proof distribution entity according to the system described herein.

Referring to FIG. 1B, a diagram 20' illustrates an alternative embodiment with a plurality of administrative entities 28a-28c. Although the diagram 20' shows three administrative entities 28a-28c, the system described herein may work with any number of administrative entities. In the embodiment shown by the diagram 20', it is possible for one of the administrative entities 28a-28c (e.g., the administrative entity 28a) to generate the credentials while other ones of the administrative entities 28a-28c (e.g., the administrative entities 28b, 28c) generate the proofs or all of the administrative entities 28a-28c generate the proofs. Optionally, the proof distribution entity 32 may be used.

Figure 1C:
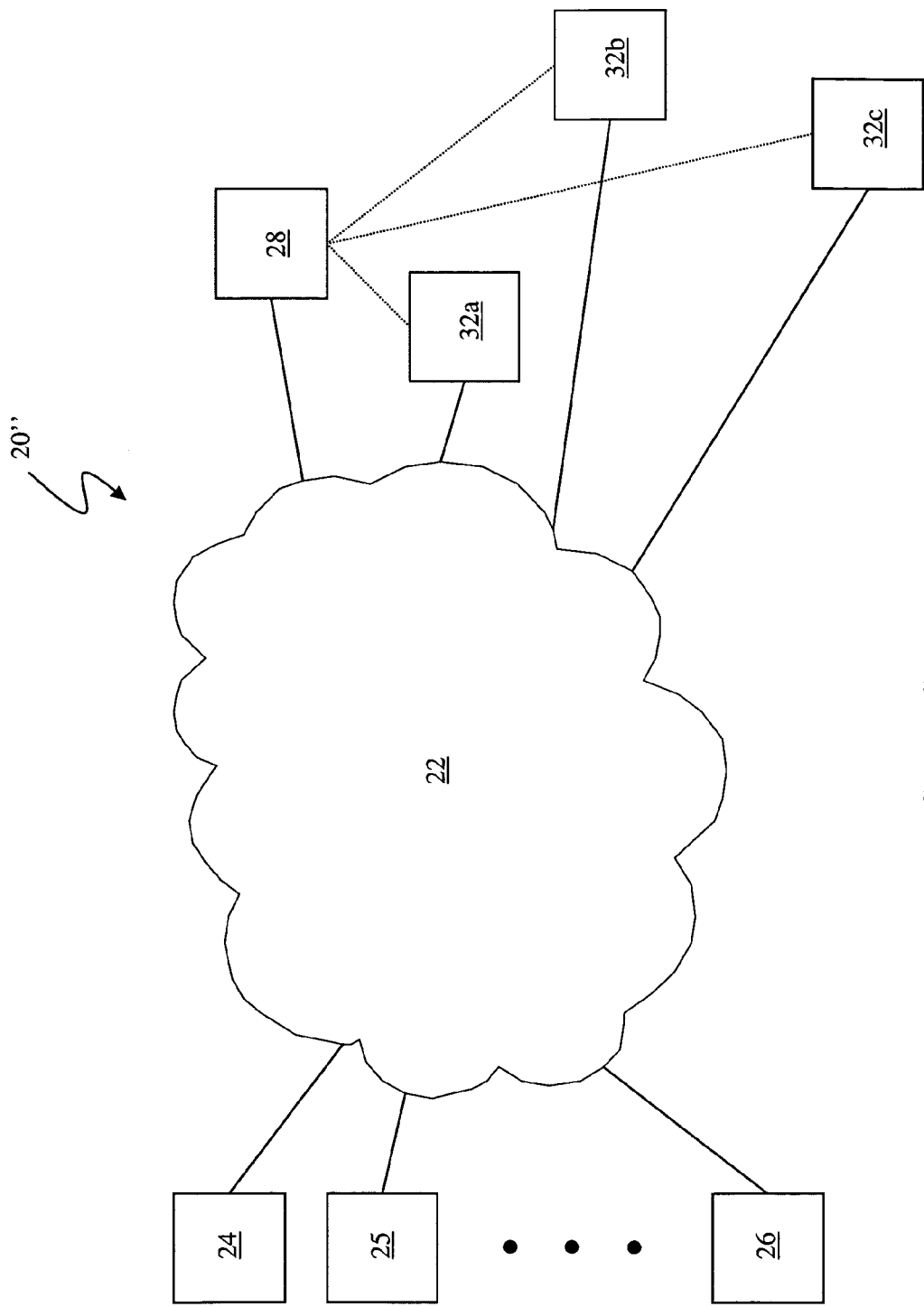
FIG. 1C is a diagram illustrating an alternative embodiment that includes a connection, a plurality of electronic devices, an administration entity, and a proof distribution entity according to the system described herein.

Referring to FIG. 1C, a diagram 20" illustrates an alternative embodiment with a plurality of proof distribution entities 32a-32c. Although the diagram 20" shows three proof distribution entities 32a-32c, the system described herein may work with any number of proof distribution entities. The embodiment shown by the diagram 20" may be implemented using technology provided by Akamai Technologies Incorporated, of Cambridge, Mass.

Figure 1D:
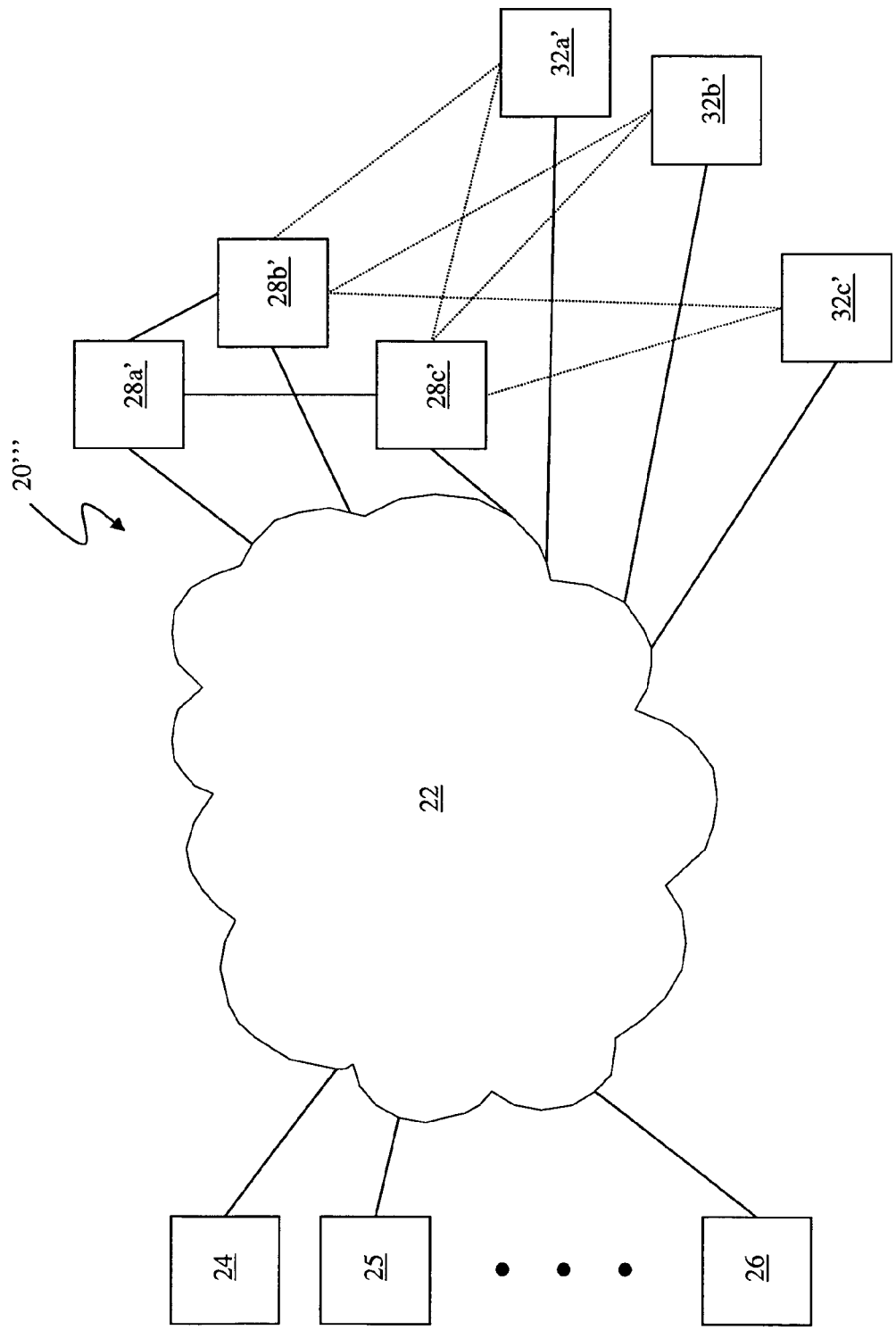
FIG. 1D is a diagram illustrating an alternative embodiment that includes a connection, a plurality of electronic devices, an administration entity, and a proof distribution entity according to the system described herein.

Referring to FIG. 1D, a diagram 20''' illustrates an alternative embodiment with a plurality of administrative entities 28a'-28c' and a plurality of proof distribution entities 32a'-32c'. Although the diagram 20''' shows three administration entities 28a'-28c' and three proof distribution entities 32a'-32c', the system described herein may work with any number of administration entities and proof distribution entities. The embodiment shown by the diagram 20''' combines features of the embodiment illustrated by FIG. 1B with features of the embodiment illustrated by FIG. 1C.

Figure 2:
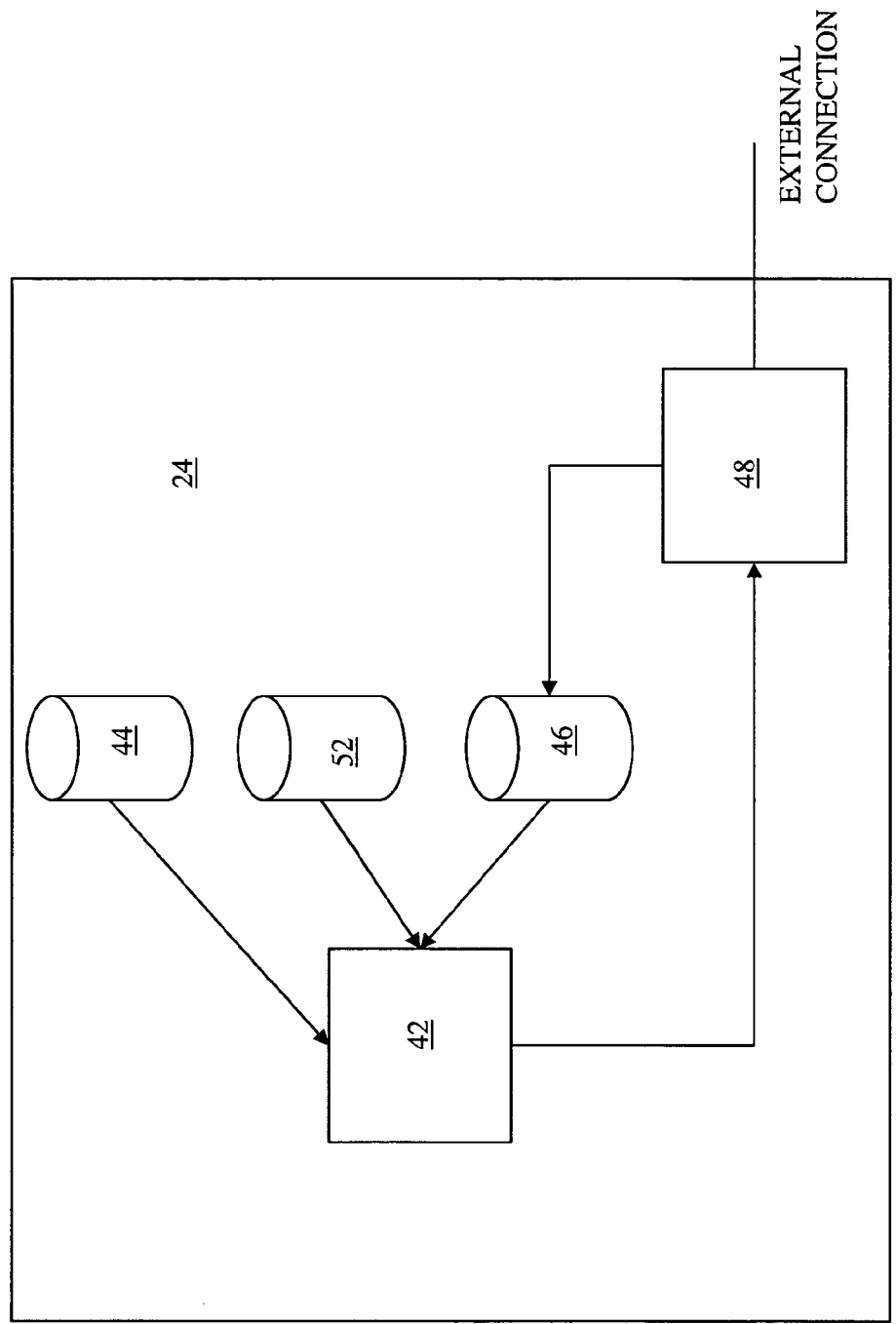
FIG. 2 is a diagram showing an electronic device in more detail according to the system described herein.

Referring to FIG. 2, a diagram illustrates the electronic device 24 in more detail as including a validation unit 42, credential data 44 and proof data 46. The validation unit 42 may be implemented using hardware, software, firmware, or any combination thereof. Upon certain conditions, such as boot up, the validation unit 42 receives a start signal that causes the validation unit 42 to examine the credential data 44 and the proof data 46 and, based on the result thereof, generate a pass signal indicating that a legitimate proof has been presented or otherwise generate a fail signal. The output of the validation unit 42 is used by follow on processing/devices such as computer boot up firmware, to determine whether operation can proceed.

In an embodiment herein, the electronic device 24 includes an external interface 48 which is controlled by the validation unit 42. As with the validation unit 42, the external interface 48 may be implemented using hardware, software, firmware, or any combination thereof. The external interface 48 is coupled to, for example, the connection 22, and is used to fetch new proofs that may be stored in the proof data 46. Thus, if the validation unit 42 determines that the proofs stored in the proof data 46 are not sufficient (e.g., have expired), the validation unit 42 provides a signal to the external interface 48 to cause the external interface 48 request new proofs via the connection 22. Of course, if the electronic 24 has been lost and/or stolen or if the user is a terminated employee or if there is any other reason not to allow access to the electronic device 24, then the external interface 48 will not be able to obtain a valid proof. In some embodiments, the external interface 48 prompts a user to make an appropriate electronic connection (e.g., connect a laptop to a network).

In an embodiment herein, time data 52 provides information to the validation unit 42 to indicate the last time that a valid proof was presented to the validation unit 42. This information may be used to prevent requesting of proof too frequently and, at the same time prevent waiting too long before requesting a new proof. Interaction and use of the validation unit 42, the external interface 48, the credential data 44, the proof data 46, and the time data 52 is described in more detail elsewhere herein.

Figure 3:
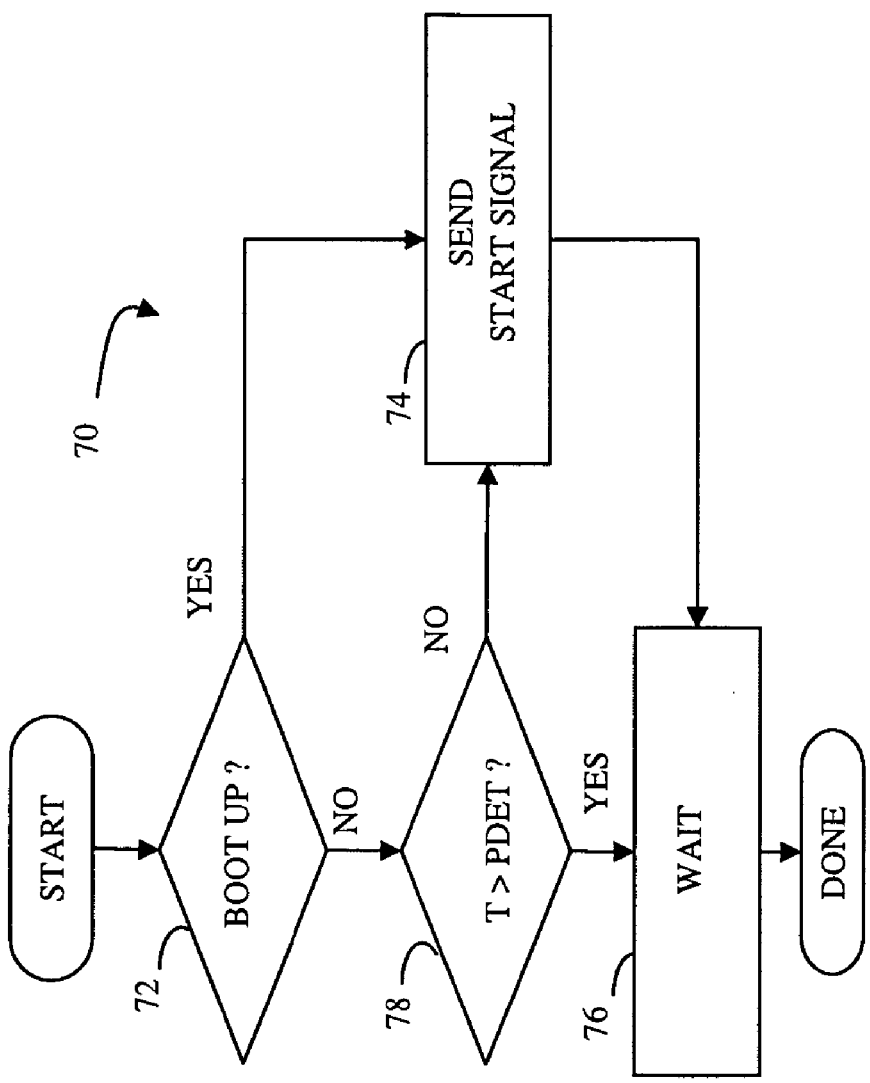
FIG. 3 is a flow chart illustrating steps performed in connection with an electronic device determining whether to perform validation according to the system described herein.

Referring to FIG. 3, a flow chart 70 illustrates steps performed in connection with determining whether to send the start signal to the validation unit 42 to determine if the validation unit 42 should examine the credential data 44 and the proof data 46 to generate a pass or fail signal. Processing begins at a first step 72 where it is determined if a boot up operation is being performed. In an embodiment herein, the proofs are always checked in connection with a boot-up operation. Accordingly, if it is determined at the test step 72 that a boot up is being performed, then control transfers from the step 72 to a step 74 where the start signal is sent to the validation unit 42. Following the step 74 is a step 76 where the process waits predetermined amount of time before cycling again. In an embodiment herein, the predetermined amount of time may be one day, although other amounts of time may also be used. Following step 76, control transfers back to the test step 72, discussed above.

If it is determined at the test step 72 that a boot up operation is not being performed, then control transfers from the test step 72 to a test step 78 where it is determined if the a predetermined amount of time has elapsed since the last running of the validation unit 42. This is determined using the time data element 52 and perhaps the current system time. In an embodiment herein, the predetermined amount of time used at the test step 78 is one day. If it is determined at the test step 78 that the amount of time since the last running of the validation unit 42 is greater than the predetermined amount of time, then control transfers from the test step 78 to the step 74 where the start signal is sent to the validation unit 42. Following the step 74 or following the test step 78 if the amount of time is not greater than the predetermined amount of time, is the step 76, discussed above.

Figure 4:
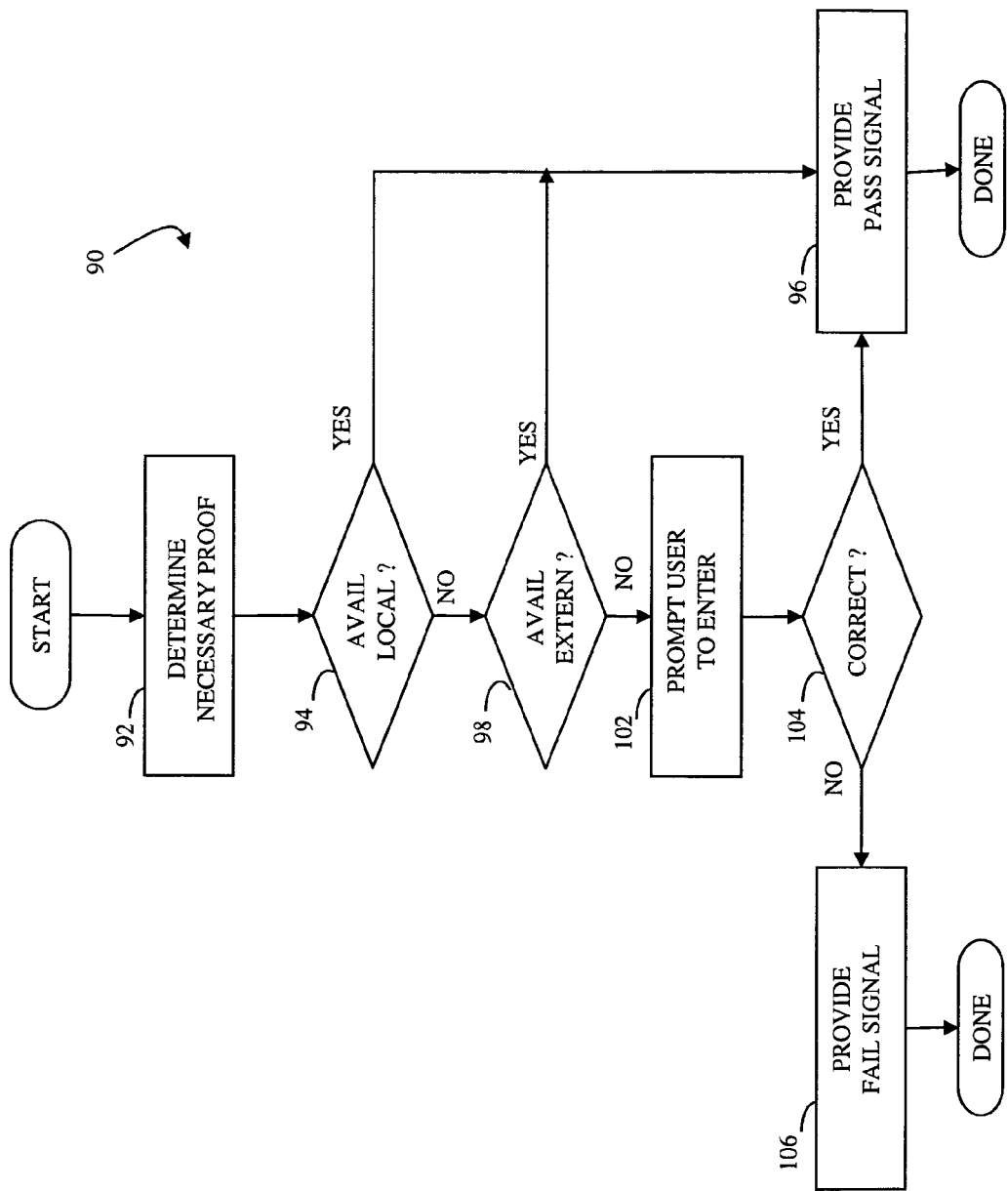
FIG. 4 is a flow chart illustrating steps performed in connection with performing validation according to the system described herein.

Referring to FIG. 4, a flow chart 90 illustrates steps performed in connection with the validation unit 42 determining if a sufficient proof has been received. As discussed elsewhere herein, the validation unit 42 sends either a pass or a fail signal to follow on processing/devices (such as computer boot up firmware or disk drive firmware). Processing begins at a first step 92 where the validation unit 42 determines the necessary proof. The necessary proof is the proof determined by the validation unit 42 sufficient to be able to send a pass signal. The validation unit 42 determines the necessary proof by examining the credential data 44, the proof data 46, the time data 52, and perhaps even the internal/system clock. Following the step 92 is a test step 94 which determines if the appropriate proof is available locally (i.e., in the proof data 46) and if the locally provided proof meets the necessary requirements (discussed elsewhere herein). If so, then control transfers from the step 94 to a step 96 where the validation unit 42 issues a pass signal. Following the step 96, processing is complete.

In some embodiments, it may be possible and desirable to obtain and store future proofs in the proof data 46. For example, a user that expects to be without a connection to the administration entity 28 and/or the proof distribution entity 32 may obtain and store future proofs. In these embodiments, the electronic device may automatically poll for future proofs when connected to the administration entity 28 and/or the proof distribution entity 32, which may be provided according to a predefined policy. Alternatively (or in addition), it may be possible for a user and/or electronic device to specifically request future proofs which may or may not be provided according to governing policy.

If it is determined at the test step 94 that the appropriate proof is not locally available (i.e., in the proof data 46), then control transfers from the test step 94 to a test step 98 where the validation unit 42 determines if an appropriate proof is available externally by, for example, providing a signal to cause the external interface 48 to attempt to fetch the proof, as discussed above. If it is determined that the test step 98 that the externally-provided proof meets the necessary requirements (discussed elsewhere here), then control transfers from the test step 98 to the step 96, discussed above, where the validation unit 42 issues a pass signal. In an embodiment herein, the externally-provided proof is stored in the proof data 46.

If it is determined at the test step 98 that an appropriate proof is not available externally, either because there is no appropriate connection or for some other reason, then control transfers from the test step 98 to a step 102 where the user is prompted to enter an appropriate proof. In an embodiment herein, if a user is at a location without an appropriate electrical connection, the user may call a particular phone number and receive an appropriate proof in the form of a number that may be entered manually into the electronic device in connection with the prompt provided at the step 102. Of course, the user may receive the proof by other means, such as being handwritten or typed or even published in a newspaper (e.g., in the classified section).

Following the step 102 is a test 104 which determines if the user has entered a proof meeting the necessary requirements (as described elsewhere herein). If so, then control transfers from the test step 104 to the step 96, discussed above, where the validation unit 42 issues a pass signal. Otherwise, control transfer from the test step 104 to a step 106 where the validation unit 42 issues a fail signal. Following the step 106, processing is complete.

Figure 5:
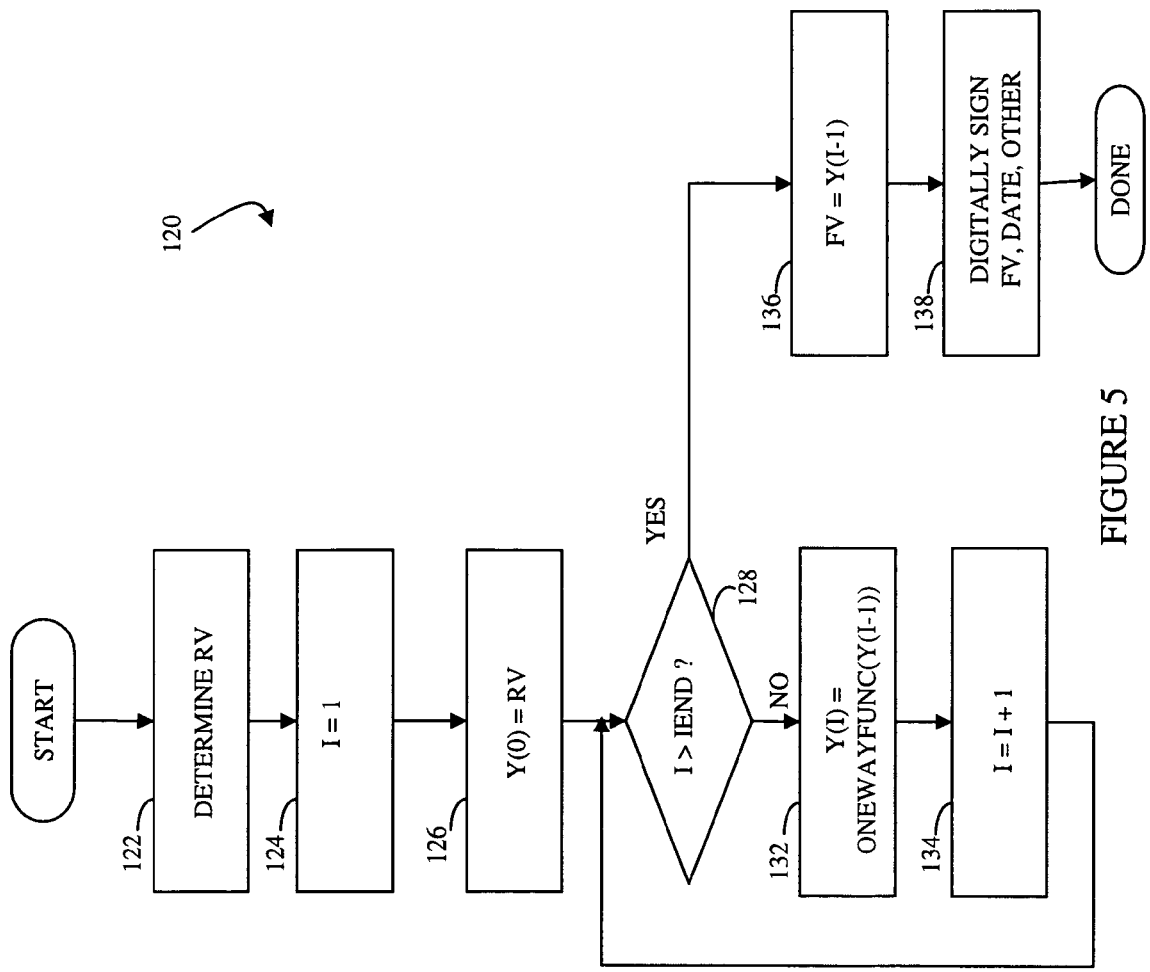
FIG. 5 is a flow chart illustrating steps performed in connection with generating credentials according to the system described herein.

Referring to FIG. 5, a flow chart 120 illustrates steps performed in connection with generating credentials used by the validation unit 42. The steps of the flow chart 120 may be performed by the administration entity 28 which generates the credentials (and a series of proofs) and provides the credentials to the electronic device 24. Other appropriate entities (e.g., entities authorized by the administration entity 28) may generate the credentials. The random value is used in connection with generating the credentials and the proofs and, in an embodiment herein, is generally unpredictable. Following the step 122 is a step 124 where an index variable, I, is set to one. In an embodiment herein, the credentials that are provided are used for an entire year and a new proof is needed each day so that three hundred and sixty five separate proofs may be generated in connection with generating the credentials. The index variable, I, is used to keep track of the number of proofs that are generated. Following step 124 is a step 126 where the initial proof value, Y(0) is set equal to the random value RV determined at the step 122.

Following the step 126 is a test step 128 which determines if the index variable, I, is greater than an ending value, IEND. As discussed above, in an embodiment herein, three hundred and sixty five proofs are generated in connection with generating the credentials so that, in this embodiment, IEND, is three hundred and sixty five. However, for other embodiments it is possible to set IEND to any number.

If it is determined at the test step 128 that the value of I is not greater than IEND, then control transfers from the step 128 to a step 132 where Y(I) is set equal to the one way function applied to Y(I−1). The one way function used at the step 132 is such that, given the result of applying the one way function, it is nearly impossible to determine the value that was input to the one way function. Thus, for the one way function used at the step 132, given Y(I), it is very difficult, if not impossible, to ascertain the value of the input (in this case Y(I−1)). As used herein, the term one way function includes any function or operation that appropriately provides this property, including, without limitation, conventional one way hash functions and digital signatures. This property of the one way function used at the step 132 is useful in connection with being able to store and distribute issued proofs in an unsecure manner, as discussed elsewhere herein. The credentials and the proofs may be generated at different times or the proofs may be regenerated at a later date by the entity that generated the credentials or by another entity. Note that, for other embodiments, it is possible to have Y(I) not be a function of Y(I−1) or any other Y's for that matter.

Processing begins at a first step 122 where a random value, RV, is generated. Following the step 132 is a step 134 where the index variable, I, is incremented. Following the step 134, control transfers back to the test step 128, discussed above. If it is determined at the test step 128 that I is greater than IEND, then control transfers from the test step 128 to a step 136 where a final value, FV, is set equal to Y(I−1). Note that one is subtracted from I because I was incremented beyond IEND. Following the step 136 is a step 138 where the administration entity 28 (or some other entity that generates the proofs and the credentials) digitally signs the final value, the current date, and other information that is used in connection with the proofs. In an embodiment herein, the other information may be used to identify the particular electronic device (e.g., laptop), the particular user, or any other information that binds the credentials and the proof to a particular electronic device and/or user and/or some other property. Optionally, the date and/or the FV may be combined with the other information. For example, it is possible to use an OCSP-like signed message that simply says, "device #123456 is valid on Jan. 1, 2004" or have a bit in a miniCRL that corresponds to a specific device being on or off. In those case, the credential on the device may authenticate the device (i.e., determine that the device really is device #123456, etc.). OCSP and mini-CRL's are know in the art. Following the step 138, processing is complete.

Figure 6:
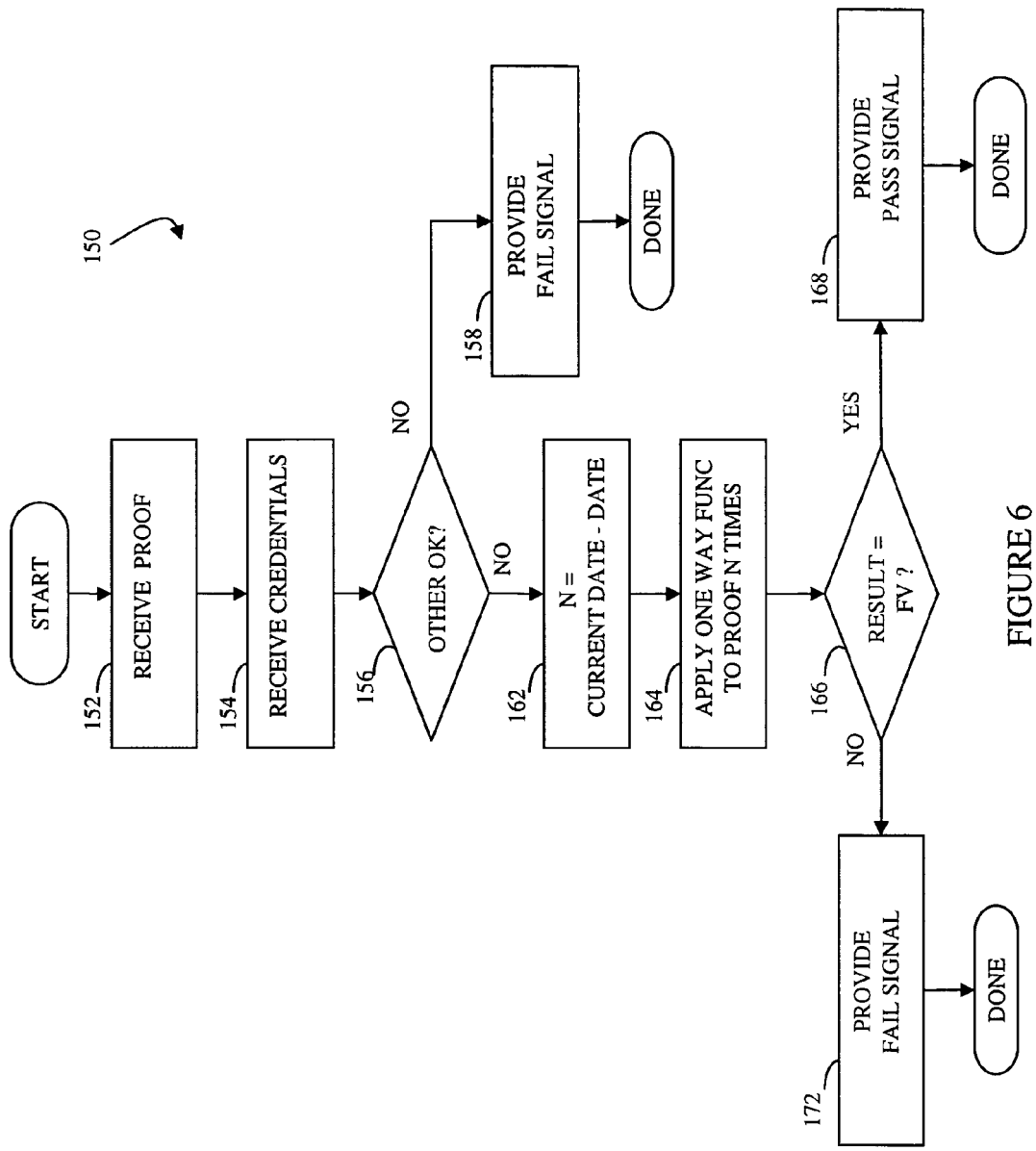
FIG. 6 is a flow chart illustrating steps performed in connection with checking proofs against credentials according to the system described herein.

Referring to FIG. 6, a flow chart 150 illustrates steps performed by the validation unit 42 in connection with determining the validity of a proof. Processing begins at a first step 152 where the validation unit 42 receives the proof (e.g., by reading the proof from the proof data 44). Following the step 152 is a step 154 where the validation unit 42 receives the credentials (e.g., by reading the credential data 46).

Following step 154 is a test step 156 which determines if the other information that is provided with the credentials is okay. As discussed elsewhere herein, the other information includes, for example, an identification of the electronic device, an identification of the user, or other property identifying information. If it is determined at the test step 156 that the other information associated with the credentials does not match the particular property described by the other information (e.g., the credentials are for a different electronic device or different user), then control transfers from the test step 156 to a step 158 where a fail signal is provided. Following the step 158, processing is complete.

If it is determined at the test step 156 that the other information associated with the credentials is okay, then control transfers from the test step 156 to a step 162 where a variable N is set equal to the current date minus the date associated with the credentials (i.e., the number of days since the credentials were issued). Following the step 162 is a step 164 where the proof value provided at the step 152 has a one way function applied thereto N times. The one way function used at the step 164 corresponds to the one way function used at the step 132, discussed above.

Following step 164 is a test step 166 which determines if the result obtained at the step 164 equals the final value FV that is part of the credentials received at the step 154. If so, then control transfers from the test step 166 to a step 168 where a pass signal is provided by the validation unit 42. Otherwise, if it is determined at the test step 166 that the result obtained at the step 164 does not equal the final value FV provided with the credentials at the step 154, then control transfers from the test step 166 to a step 172 where a fail signal is provided by the validation unit 42. Following step 172, processing is complete.

Digital signatures may provide an effective form of Internet authentication. Unlike traditional passwords and PINs, digital signatures may provide authentication that may be universally verifiable and non-repudiable. Digital signatures may be produced via a signing key, SK, and verified via a matching verification key, PK. A user U keeps his own SK secret (so that only U can sign on U's behalf). Fortunately, key PK does not "betray" the matching key SK, that is, knowledge of PK does not give an enemy any practical advantage in computing SK. Therefore, a user U could make his own PK as public as possible (so that every one can verify U's signatures). For this reason PK is preferably called the public key. Note that the term "user" may signify a user, an entity, a device, or a collection of users, devices and/or entities.

Public keys may be used also for asymmetric encryption. A public encryption key PK may be generated together with a matching decryption key SK. Again, knowledge of PK does not betray SK. Any message can be easily encrypted with PK, but the so computed ciphertext may only be easily decrypted via knowledge of the key SK. Therefore, a user U could make his own PK as public as possible (so that every one can encrypt messages for U), but keep SK private (so that only U can read messages encrypted for U).

The well-known RSA system provides an example of both digital signatures and asymmetric encryption.

Alphanumeric strings called certificates provide that a given key PK is a public key of a given user U. An entity, often called certification authority (CA), generates and issues a certificate to a user. Certificates expire after a specified amount of time, typically one year in the case of public CAs. In essence, a digital certificate C consists of a CA's digital signature securely binding together several quantities: SN, a serial number unique to the certificate, PK, the public key of the user, U, the user's name, $D_1$, the issue date, $D_2$, the expiration date, and additional information (including no information), AI. In symbols, $C = SIG_{CA}(SN, PK, U, D_1, D_2, AI)$.

Public encryption keys too may provide a means of authentication/identification. For instance, a party knowing that a given public encryption key PK belongs to a given user U (e.g., because the party has verified a corresponding digital certificate for U and PK) and desirous to identify U, may use PK to encrypt a random challenge C, and ask U to respond with the correctly decryption. Since only the possessor of SK (and thus U) can do this, if the response to the challenge is correct, U is properly identified.

It is possible to provide a system to control physical access to an area using a smart door (and/or smart virtual door, see description elsewhere herein). A smart door may verify that the person entering is currently authorized to do so. It may be advantageous to provide the door not only with the credential of a given user, but also with a separate proof that the credential/user is still valid in a way that can be securely utilized even by a disconnected door. In an embodiment, such proofs are generated as follows. Assume that a credential specifies the door(s) a user may enter. Then, for each credential and each time interval (e.g., each day), a proper entity E (e.g., the same entity that decides who is authorized for which door at any point in time, or a second entity working for that entity) computes an authenticated indication (PROOF) that a given credential is valid on the given time interval. (If credentials do not identify the doors users are authorized to enter, a PROOF may also specify the door(s) the credential is good for on the given time interval).

A PROOF of E may consist of a digital signature of E indicating in an authenticated manner that a given credential is valid for a given interval of time, for instance: $SIG_E(ID, Day, Valid, AI)$, where ID is information identifying the credential (e.g., the credential's serial number), Day is an indication of the given time interval (without loss of generality intended, a given day), Valid is an indication that the credential is deemed valid (this indication can be omitted if E never signs a similar data string unless the credential is deemed valid), and AI indicates any additional information (including no information) deemed useful. In some instances, the signature of E may be a public-key signature. (But it could also be a private-key signature, that is, one that may be produced and verified via a single, secret key, known both to the signer and the verifier.) If the credential consists of a digital certificate, one sub-embodiment may consist of a short-lived certificate, that is, a digital signature that re-issues the credential for the desired time interval (e.g., a digital certificate specifying the same public key, the same user U and some other basic information as before, but specifying the start date and the expiration date so to identify the desired—-without loss of generality intended—day). For instance, letting, without loss of generality intended, a short-lived certificate last for a day, in such sub-embodiment a PROOF may take the form $SIG_E(PK, U, D_1, D_2, AI)$, where start-date $D_1$ indicates the beginning of a given day D and end-date $D_2$ the corresponding end of day D, or where $D_1=D_2=D$; or more simply using a single date-information field to identify the day in question, $SIG_E(PK,U, Day,AI)$. If E coincides with the original certification authority, a short-lived-certificate PROOF may take the form $SIG_{CA}(PK,U,D_1,D_2,AI)$ or $SIG_{CA}(PK,U,Day,AI)$.

Being authenticated, a user may not manufacture his own PROOF of the day (i.e., the PROOF of the day of his own credential), nor can he change his PROOF of yesterday into his own PROOF of today, nor the PROOF of another user for today into his own for today. Because PROOFs are essentially unforgeable and inalterable, these PROOFs need not be protected. Thus, entity E may make the PROOFs available with negligible cost. For instance, E may post all the PROOFs of a given day on the Internet (e.g., make the PROOFs available via Akamai servers or the equivalent), or send the PROOFs to responders/servers that may be easily reached by the users. For instance, to a server located at the entrance of an airport (or office building) where many of the doors to be correctly accessed are located. This way, an employee coming to work may easily pick up his own PROOF (e.g., by inserting his own card into a card reader coupled with the server) and—say—store the PROOF onto his own card, together with his own credential. This way, when the user presents his card to a door that his credential authorizes to access, the door can not only verify the credential but also receives and verifies a PROOF of current authorization, without needing to be connected at all! The door verifies the PROOF (e.g., the digital signature of E via E's pubic key that it may store since installation) and that the time interval specified by the PROOF is proper (e.g., via its own local clock). If all is fine, the door grants access else, the door denies access. In essence, the door may be disconnected and yet its PROOF verification may be both relatively easy (because the door may receive the PROOF by the most available party: the very user demanding access) and relatively secure (though the door receives the PROOF from arguably the most suspicious party: the very user demanding access). In fact, a user demanding access may typically be in physical proximity of the door, and thus can provide the PROOF very easily, without using any connection to a distant site, and thus operate independent of the door's connectivity.

At the same time, the user demanding access may be the least trustworthy source of information at that crucial time. Nonetheless, because the user may not manufacture or alter a PROOF of his own current validity in any way, the door may be sure that a properly verified PROOF must be produced by E, and E would have not produced the PROOF if E knew the user to be not authorized for the given time interval. When a user stops being authorized, E will stop issuing PROOFs of authorization for the user, and thus the user can no longer enter even disconnected doors, because the user will lack the PROOF that a door needs to verify in order to grant access. Thus, by utilizing the user demanding access to prove proper and current authorization, the system described herein dispenses with inconveniences associated with other systems, i.e., the need to dispatch a crew to re-program disconnected doors.

This approach also enables one to manage disconnected-door access by "role" (or by "privilege"). That is, rather than having a credential specify the door(s) that its user is authorized to enter, and then issue—e.g., daily—a PROOF of current validity of a credential (or rather than issuing a PROOF specifying that a given credential authorizes his user to enter some door(s) on a given time interval), disconnected doors may be programmed (e.g., at installation time) to grant access only to users having a given role. For instance, a cockpit door in an airplane may be programmed to grant access only to PILOTS and INSPECTORS. The credentials may be issued to employees primarily to vouch for their identity (which does not change), while each PROOF that E—e.g., daily—issues for a given credential may also specify (e.g., in the AI field) the role(s) of its corresponding user on that day. For instance, $PROOF=SIG_E(ID, Day, PILOT, AI)$ proves on day Day the user corresponding to credential identified by ID is a pilot. This way, employees may "migrate" from one role to the next without having their credential reissued, and without any need to specify within a user credential or in its corresponding daily PROOF which doors the user may access that day. Note that the number of such doors may be huge. Thus, specifying within a user credential all the doors a user may be authorized to access may be cumbersome. Moreover, if new doors are added (e.g., because new airplanes are bought) then the pilot's credential may have to be reissued, which is cumbersome too, to specify the additional doors.

The time intervals appropriate for a given credential may be specified within the credential itself, or may be specified by the credential and the PROOF together. For instance, a credential may specify a given start day and that it needs to be proved valid every day, while the PROOF may specify time interval 244, to mean that the PROOF refers to day 244 after the start day specified in the credential.

The system described herein may also be advantageous relative to more expensive connected-doors systems. For instance, assume that all doors were securely connected to a central database, and that a sudden power outage occurs (e.g., by sabotage). Then the connected doors may be forced to choose between two extreme alternatives: ALWAYS OPEN (good for safety but bad for security, particularly if terrorists caused the outage) and ALWAYS CLOSED (bad for safety but good for security). By contrast, in case of a sudden power outage, the system described herein offers a much more flexible response, some (no longer) connected doors may remain always closed, others always open and others yet may continue to operate as per the disconnected-door access control described herein. That is, the doors, relying on batteries, may open only if the right credential and the right PROOFs are presented. In fact, before the outage occurs it is possible for all employees to receive their expected PROOFs regularly.

Entity E may of course produce PROOFs specifying different time intervals for different credentials. For instance, in an airport facility, police officers and emergency personnel may every day have a PROOF specifying the next two weeks as the relevant time interval, while all regular employees may have daily PROOFs specifying only the day in question. Such a system may provide better control in case of a long and unexpected power outage. Should such a power outage occur, the daily usual distribution of PROOFs may be disrupted and ordinary employees may not receive their daily PROOFS, but policemen and emergency handlers may still carry in their cards the two-week proofs they received the day before and thus may continue to operate all doors they are authorized to enter (e.g., all doors).

It should be realized that the approach described herein encompasses using credentials consisting of a reduced form of certificate, that may be called minimal certificates. A minimal certificate may essentially omit the user name and/or the identifier ID of the certificate (or rather replace the user name and/or the identifier ID with a public key of the certificate, which may be unique for each certificate). For instance, a minimal certificate credential may take the form $C=SIG_{CA}(PK,D_1,D_2,AI)$ with the understanding that proper presentation of this credential includes proving knowledge of the secret key SK corresponding to PK (e.g., by a challenge-response method). The door may know beforehand whether (or not) proper presentation of a credential relative to PK (preferably if currently validated) should result in granting access. Alternatively, a minimal credential C may specify (e.g., in AI) whether or not a user who knows the corresponding SK is entitled to enter a given door. A PROOF relative to a minimal certificate whose public key is PK, may be of the form $SIG_E(ID, Day, Valid, AI)$ or $SIG_E(PK,Day,Valid,AI)$, or $SIG_E(ID,Day,AI)$ if it is understood that any similar signature indicates validity by implication. Alternatively, a currency PROOF of a minimal certificate may take the form of the re-issuance of a minimal short-lived certificate: e.g., $SIG_E(PK,D_1,D_2,AI)$, where start date $D_1$ indicates the beginning of a given day D and $D_2$ the corresponding end of day D, or $D_1=D_2=D$; or $SIG_E(PK,Day,AI)$; or, letting E coincide with the original certification authority, $SIG_{CA}(PK,D_1,D_2,AI)$ or $SIG_{CA}(PK,Day,AI)$. In general, any method described herein directed to certificates should be understood to apply to minimal certificates as well.

A smart door may verify the validity and currency of a user's credentials which may be accompanied by a corresponding proof. The credentials/proofs used by a user to obtain access to an area may be similar to the credentials/proofs used in connection with controlling access to electronic devices, as discussed elsewhere herein. The following are examples of credentials/proofs, some of which may be combined with others:

1. a PIN or password, entered at a key pad associated with the door or communicated to the door by a user's card;
2. biometric information, provided by a user via a special reader associated with the door;
3. a traditional (handwritten) signature, provided by a user via a special signature pad associated with the door;
4. a digital certificate for a public key PK (e.g., such a credential can be stored in a user's card and the right user/card may use the corresponding secret key SK to authenticate/identify itself to the door—e.g., via a challenge response protocol). For instance, if PK is a signature public key, the door may ask to have signed a given message and the right user—the only one who knows the corresponding secret signing key SK—may provide the correct requested signature; if PK is a public encryption key, the door may request to a have a given challenge ciphertext decrypted, which can be done by the right user, who knows the corresponding secret decryption key SK;
5. an enhanced digital certificate that includes a daily "validation value" (which assures that the certificate is valid on this particular date), stored in a user's card and communicated to the door;
6. a digital signature of a central authority confirming that a user's certificate is valid at the current time, communicated to the door by a server or a responder;
7. a digital certificate that is stored in a user's card and communicated to the door, as well as a daily "validation value" communicated to the door by a server or a responder;
8. a secret, stored in a user's card, knowledge of which is proven to the door by an interactive (possibly zero-knowledge) protocol with the door;
9. a secret-key signature of an authority, stored in a user's card, indicating that the user is authorized to enter on a particular day.

Thus, in some instances, credentials/proofs are provided in a single part while, in other instances, credentials/proofs are provided in separate parts, the credentials and, separately, the proofs. For example, where the credentials/proofs consists of an enhanced digital certificate that includes a daily validation value which indicates that the certificate is valid on this particular date and is associated with a user and communicated to the door, the credentials (the enhanced digital certificate) may be provided separately (by different means and/or at different times) from the proofs (the daily validation value). Similarly, the credentials and the proofs may be all generated by the same authority or may be generated by different authorities.

Figure 7:
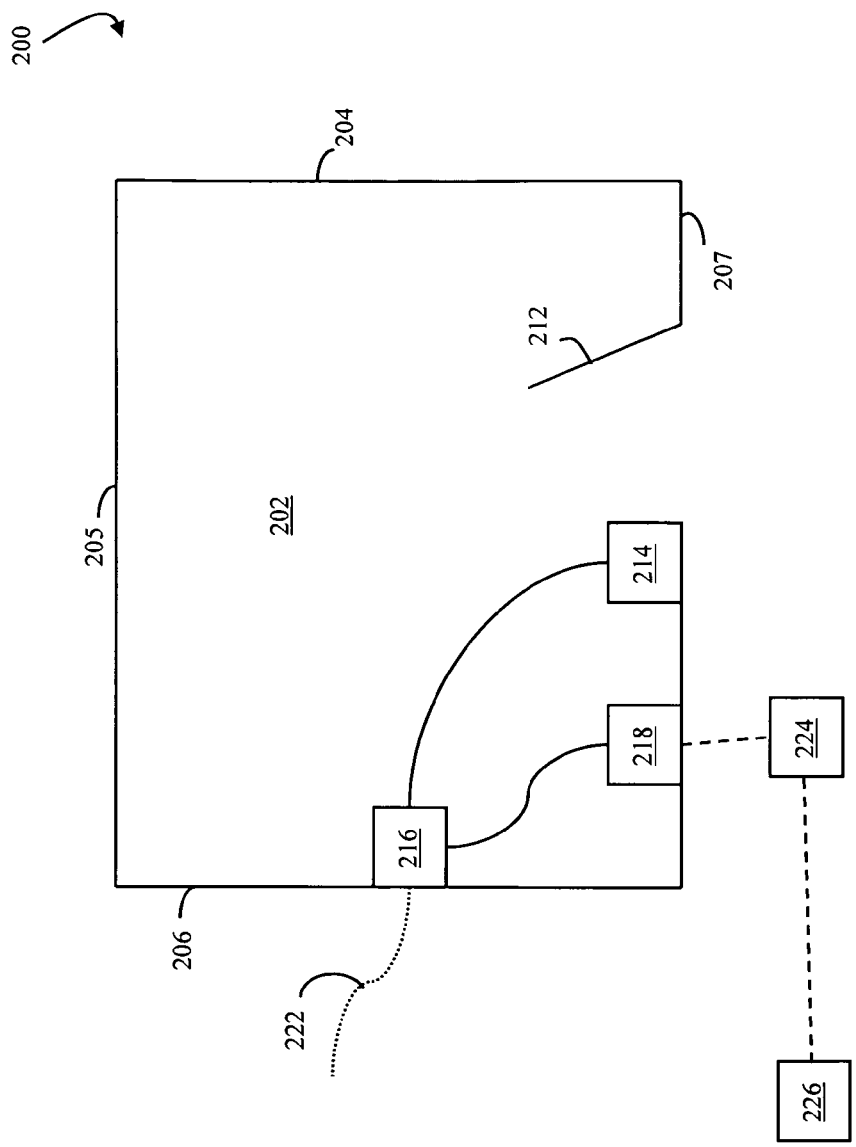
FIG. 7 is a diagram illustrating a system that includes an area in which physical access thereto is to be restricted according to the system described herein.

Referring to FIG. 7, a diagram illustrates a system 200 that includes an area 202 in which physical access thereto is to be restricted. The area 202 is enclosed by a plurality of walls 204-207. The wall 207 has a door 212 therein for providing egress to the area 202. In other embodiments, more than one door may be used. The walls 204-207 and the door 212 provide a barrier to access to the area 202. The door 212 may be locked using an electronic lock 214, which prevents the door 212 from opening unless and until the electronic lock 214 receives an appropriate signal. The electronic lock 214 may be implemented using any appropriate elements that provide the functionality described herein, including, without limitation, using off-the shelf electronic locks.

The electronic lock 214 may be coupled to a controller 216, which provides an appropriate signal to the electronic lock 214 to allow the door 212 to be opened. In some embodiments, the electronic lock 214 and the controller 216 may be provided in a single unit. The controller 216 may be coupled to an input unit 218, which may receive a user's credentials and, optionally, also receive a corresponding proof indicating that a user is currently authorized to enter the area 202. The input unit 218 may also receive a hot revocation alert (HRA) indicating that the user is no longer allowed to enter the area 202. HRA's are described in more detail hereinafter. The input unit 218 may be any appropriate input device such as a key pad, a card reader, a biometric unit, etc.

Optionally, the controller 216 may have an external connection 222 that may be used to transmit data to and from the controller 216. The external connection 222 may be secure although, in some embodiments, the external connection 222 may not need to be secure. In addition, the external connection 222 may not be required because the functionality described herein may be provided using stand-alone units having no external connections. In instances where the external connection 222 is provided, the external connection 222 may be used to transmit credentials, proofs, HRA's and/or may be used in connection with logging access to the area 202. Logging access is described in more detail elsewhere herein. Note that the external connection 222 may be intermittent so that, for example, at some times the external connection 222 provides connectivity for the controller 216 while at other times there may be no external connection for the controller 216. In some instances, the external connection 222 may be used to transmit a portion of the credentials/proofs (e.g., a PKI digital certificate) while a user presents to the input unit 218 a remaining portion of the credentials/proofs (e.g., a daily validation value used in connection with the digital certificate).

In some embodiments, a user may present a card 224 to the input unit. As discussed elsewhere herein, the card 224 may be a smart card, a PDA, etc. that provides data (e.g., credentials/proofs) to the input unit 218. The card 224 may get some or all data from a transponder 226. In other instances, the card 224 may get data from other cards (not shown), from the input unit 218 (or some other mechanism associated with accessing the area 202), or some other appropriate source.

In a first example, credentials and proofs may be maintained using a pin/password with physical protection. In this example, every morning a server generates a new secret password SU for each authorized user U and communicates the new SU to specific doors to which U is allowed to access. The communication may be encrypted to be sent using unsecure lines or may be transmitted to the doors via some other secure means. When U reports to work in the morning, the central server causes the U's card to receive the current secret password SU. The secret password SU is stored in the secure memory of the card, which can be read only when the card is properly authorized (e.g., by the user entering a secret PIN in connection with the card or by connecting with trusted hardware on the server or the doors). Whenever the user attempts to access a door, the card securely communicates SU to the door. The door then checks if the value SU received from the card matches the value received from the server in the morning, and, if so, allows access.

Thus, SU is the user's credential for a day. This system has the advantage that each credential is of limited duration: if an employee is terminated or his card is stolen, his credentials will not be useful the next day. The system, however, requires some connectivity: at least a brief period of connectivity (preferably every morning) is needed to update the door. This transmission should be secured (e.g., physically or cryptographically).

In another example, the user's credentials include secret-key signatures. This example utilizes signatures, either public-key signatures (e.g., RSA signatures) or secret-key signatures (e.g., Message Authentication Codes, or MACs). For instance, an access-control server uses a secret key SK to produce signatures, and the door has means to verify such signatures (e.g., via a corresponding public key or by sharing knowledge of the same SK). When a user U reports to work in the morning on a day D, the server causes the user's card to receive a signature Sig authenticating U's identifying information (e.g., the unique card number, or U's secret password, or biometric information such as U's fingerprints) and the date D. When U attempts to access a door, the card communicates the signature Sig to the door, which verifies its validity possibly in conjunction with identifying information supplied by U, and the date supplied by the door's local clock. If all is correct, the door allows access.

In this technique, the signature Sig may be considered the user's credentials and proof together. This method has its own advantages: the cards need not store secrets, and the doors need not maintain secure connections to a central server, nor a long list of valid credentials.

In another example, the user's credentials include a digital certificate with hash-chain validity proofs similar to those generated in connection with the flow chart 120 of FIG. 5. This example utilizes public-key signatures and a one-way hash function H (implementing a special type of digital signature). A central authority has a key pair: a public key PK (known to the doors) and a secret key SK that is not generally known. For a user U, the authority generates a random secret value X0 and a computes values $X1=H(X0)$, $X2=H(X1), \ldots, X365=H(X364)$. Because H is a one-way hash function, each value of X cannot be computed from the next value of X. The authority issues to U a digital certificate Cert, signed using SK and containing the value X365, valid for one year. Then, when U reports to work on day i, the authority causes the user's card to receive the day's validation value Xj, where $j=365-i$. When U attempts to access a door, the card communicates the validation value Xj and certificate Cert containing X365 to the door. The door verifies the validity of the Cert with public key PK of the authority and also checks that H applied i times to Xj produces X365. Note that the "one year" and 365 may be replaced with any other time period.

Thus, the user's certificate Cert as well as the validation value Xj make up the user's credentials/proof. This system has many advantages: neither the door nor the card need to store any secrets; the door need not have any secure connections; the certificate can be issued once a year; and thereafter the daily computational load on the central authority is minimal (because the authority just needs to retrieve Xj); the daily validation values can be provided by unsecured (cheap) distributed responders, because they need not be secret.

A credential/proof for a user U is often limited in its duration, which is useful in a number of circumstances. For example, if U is an employee of an airport and is terminated, his credentials/proof may expire at the end of the day and he will be no longer able to access the airport's doors. For more precise access control, it may be desirable to have shorter-duration credentials. For example, if the credential/proof for U includes the hour and the minute as well as the date, then U can be locked out of the airport within one minute of being terminated. However, shorter-duration credentials/proof may require more frequent updating, which adds expense to the system. It could be inconvenient if every employee at an airport had to upload new credentials/proof onto his or her card every minute. Thus, there may be an inherent tension between the desires to have short-term credentials and to have a lower-cost system, which may lead to credentials that are sometimes longer than desired. For example, U may need to be locked out of the airport immediately, but his credential won't expire until midnight. It is therefore desirable to provide for immediate revocation of credentials that have not yet expired.

Note that, if credentials/proofs are always stored in a secured database that is queried by doors each time access is requested, it is relatively straight-forward to revoke credentials/proofs by, for example, removing the revoked credentials/proofs from the database. However, having a door query a secure database each time is expensive. First, because this adds a significant delay to the transaction since the user wants access the door right away, but he must wait for the query to be properly completed. Second, because this communication is preferably conducted over a secure channel, which can easily cost $4,000 per door (or more) or be entirely unavailable in some cases (e.g., for doors of airplanes or cargo containers). Third, because a single secure database may only handle a limited query load, and replicating a secure database is in itself expensive and time consuming (e.g., because the costs of keeping the database secure must be duplicated and the effort to keep these copies synchronized must be added). Therefore, unlike the fully connected approach, disconnected or intermittently connected approaches (such as those in the examples above) require less communication and often store credentials/proofs on non-secured responders or on the cards themselves. In such a case, simply removing credentials/proofs from the database may not suffice. To refer again to the above examples, the password SU, or the authority signature, or the validation value Xj would somehow have to be removed from a user's card or the doors. Moreover, even such a removal may not always guarantee revocation of a credential since a credential stored in an unsecured responder may be available to anyone, including a malicious attacker who could save it and attempt to use it after its removal from the user's card. Thus, even though cost-effective solutions with limited-duration credentials exist, these solutions, by themselves, do not necessarily provide sufficient revocation of a non-expired credentials/proofs.

Revoking credentials/proofs, may be performed using a Hot Revocation Alert (HRA), which is a (preferably authenticated) piece of data transmitted to the door that will prevent the door from granting access to a user with revoked (though possibly unexpired) credentials/proofs. For example, an HRA may consist of a digitally signed message indicating that given credentials/proofs have been revoked. Note, however, that a signature may not always be involved in an HRA. For example, in the case of a securely connected door, just sending an HRA along the protected connection may suffice. However, as mentioned above, securely connected doors may be expensive in some instances and impossible (or nearly so) in others.

It is useful if HRA's are authenticated so that an entity to which an HRA is presented may be relatively certain that the HRA is genuine. Letting ID be an identifier for the revoked credentials/proofs C (in particular, ID may coincide with C itself), then SIG(ID, "REVOKED", AI) may be an HRA, where "REVOKED" stands for any way of signaling that C has been revoked ("REVOKED" may possibly be the empty string if the fact that the credentials/proofs are revoked could be inferred by other means—such as a system-wide convention that such signed messages are not sent except in case of revocation), and AI stands for any additional information (possibly date information—such as the time when the credentials/proofs have been revoked and/or the time when the HRA was produced—or no information). The digital signature SIG may be, in particular, a public-key digital signature, a secret-key digital signature, or a message authentication code. It is also possible to issue an authenticated HRA by properly encrypting the information. For example, an authenticated HRA may take the form ENC(ID, "REVOKED", AI).

Another notable example of an authenticated HRA is described in U.S. Pat. No. 5,666,416, which is incorporated herein by reference. The issuing authority incorporates into a credential/proof C a public key PK (of a digital signature scheme) that is unique to C, so that a digital signature relative to that PK indicates that C is revoked. In a special embodiment of such a scheme, PK may consist of a value Y1 computed as Y1=H (Y0), where H is a (preferably hashing) one-way function and Y0 is a secret value. When credential/proof C is revoked, the HRA consisting of just Y0 is issued. Such an HRA can be verified by hashing Y0 and checking that the result matches the value Y1 which belongs to the credential/proof C.

Note that a signature may not be required for an HRA. For example, in case of a securely connected door, just sending (ID, "REVOKED", AI) along the protected connection may suffice as an HRA. However, the advantage of authenticated HRA's is that HRA's themselves need not be secret. Authenticated HRAs, once authenticated by the appropriate authority, may be store on one more (possibly geographically dispersed) responders. Furthermore, these responders may be unprotected (unlike the issuing authority), because they are not storing secret information. Greater reliability may be provided at a lower cost by replicating multiple unprotected responders. Some additional advantages of the authenticated-HRA example of U.S. Pat. No. 5,666,416 are: (1) the HRA is relatively short (can be as short as twenty bytes), (2) is relatively easily computed (simply a look-up of the previously stored Y0) and (3) is relatively easily verified Oust one application of one-way hash function).

Authenticated HRAs may be particularly advantageous for efficient broad dissemination, as further described below. When an HRA transits through multiple points on the way the door, there may be multiple possibilities for an incorrect HRA to be inserted into the system. Indeed, an HRA received by the door not directly through or from the issuer via a secure connection may be no more than a mere rumor of particular credential's revocation. If the HRA is authenticated, however, this rumor can be readily confirmed by the door, which can verify its authenticity.

In general, an HRA may be specific to a single credential/proof or may provide revocation information about a multiplicity of credentials/proofs. For instance, if ID1, . . . , IDk are identifiers for revoked credentials, an HRA may consist of the single digital signature SIG(ID1, . . . , IDk; "REVOKED"; AI). Consider the case of a door that stores information identifying the credentials/proofs which have the right to access the door. If such a door receives an HRA indicating that one or more credentials/proofs are revoked, the door does not need to store the HRA. It suffices for the door to erase the identified credential(s)/proof(s) from its storage (or mark them "REVOKED" somehow). Then, if a user with a revoked credential/proof attempts access, the door will not allow access because the presented credential/proof is not currently stored therein or, if stored therein, is marked "REVOKED".

Consider now a case of a door that does not store information identifying all allowed credentials/proofs, but rather verifies whether a credential/proof is allowed when presented. When a user presents a credential/proof to such a door, the door may first verify whether the credential/proof is valid, disregarding HRA's. (For instance, if the credential/proof includes a digital signature, the door verifies the signature. In addition, if the credential/proof includes an expiration time, the door may also verify that the credential/proof is not expired, e.g., using an internal clock.) But even if all the checks are passed, the door may still deny access if the credential/proof is indicated as being revoked by an HRA. Therefore, it is helpful if such a door has information concerning relevant HRAs. One way to achieve this is for the door to save all HRAs presented to the door. On the other hand, in some instances, this may become impractical. Consider a system where many credentials/proofs could be used to go through that door. For example, the Department of Transportation is envisaging a 10,000,000-credential system for a variety of individuals (including pilots, airport staff, airline employees, mechanics, baggage handlers, truck drivers, police, etc.) who may at one time or another be allowed access to a given door. At a modest 10% annual revocation rate, the door may have 1,000,000 HRAs to store by the end of a year, which may be a very costly (if not infeasible) task.

Moreover, if the quantity of the HRAs cannot be precisely determined in advance, the designers of a system may have to overestimate the storage size for HRA's in order to be on the safe side, and build even more storage capacity (at even more cost) into the door.

This problem may be addressed by means of removable HRAs. This means having an HRA indicate a time component specifying when the HRA can be safely removed from storage. For instance, in a system with credentials/proofs of limited duration, this can be achieved by (1) having a credential/proof include an expiration time after which the credential/proof should not be accepted by the door as valid for access; (2) having an HRA revoking the credentials/proof include the expiration time and (3) having the door remove from its storage the HRA revoking the credentials/proof after the expiration time. For instance, the expiration time for a credential/proof could be the time at which the credential/proof expires (and the expiration time could be explicitly included and authenticated within the credential/proof or it could be implied by system-wide conventions) Removing such HRA after the expiration time does not harm security. In fact, if the door does not store the HRA that revokes a particular credential/proof, it may be because the door erased the HRA from memory after expiration, at which point the out-of-date credential/proof will be denied access by the door anyway.

Note that step (2) above may be optional in cases where the expiration time can be indicated in an HRA implicitly or indirectly. For instance, the HRA may have the form SIG(C, "REVOKED", AI), and the credentials/proof may include its own expiration date. In addition, step (1) above may be optional since removable HRAs may also be implemented with HRAs that do not indicate the expiration times of the revoked credentials at all. For instance, if all credentials in a particular system are valid for at most one day, then all HRAs may be erased after being stored for a day. (More generally, if the maximum lifetime of a credential/proof may be inferred somehow, then a corresponding HRA may be erased after being stored for that amount of time.) As for another example, when presented with a credential/proof with a particular expiration time, the door may look for an HRA revoking the credential. If one exists and the expiration time has passed already, then the door may safely remove the HRA. Else, the door may store the expiration time in connection with the stored HRA, and remove the HRA after that time.

A door may remove HRAs after their expiration in a variety of ways. In some cases, HRA removal may be accomplished efficiently by maintaining a data structure (such as a priority queue) of HRAs based on expiration times. Alternatively, the door may periodically review all HRAs in storage and purge the ones that are no longer needed. As another alternative, the door may erase an HRA if, when encountering the HRA, the door realizes the HRA is no longer relevant. For instance, the HRAs may be stored in a list that is checked each time a credential is presented for verification. Whenever an expired HRA is encountered in such a list, the expired HRA may be removed. As yet another alternative, the door may remove HRAs only as needed, when memory needs to be freed (perhaps for other HRAs).

Removable HRAs may significantly reduce the storage required at the door. Using the above example of 10,000,000 users and 10% annual revocation rate, then, if HRAs expire and are removed, on average, in one day, only 2,740 (instead of 1,000,000) HRAs may need to be stored. This reduced storage requirement is a great potential advantage of removable HRAs.

It is useful for HRAs to be made available to the doors as quickly as possible, in order to inform the doors of credentials/proofs that are no longer acceptable. This may be a problem for disconnected doors, but it may also be a problem for fully connected doors. Of course, a fully connected door may be sent an HRA over the connection of the door when the HRA is issued. However, this transmission may still be blocked or jammed by a determined enemy. (e.g., if the connection to the door is secured by cryptographic means, an enemy may just cut the wire, or alter/filter the traveling signals. If the connection to the door is secured by running a wire in a steel pipe, then such jamming and blocking may be harder, but still is not impossible.) Such malicious jamming and blocking of an HRA may be even easier to carry out for doors with intermittent (e.g., wireless) connectivity.

In order to make it harder for an enemy to prevent a door from receiving an HRA, an HRA may be carried by a revoked card itself. For instance, when a card communicates with a database or a connected door (or any door that knows of the relevant HRA), the door may send the HRA to the card, which may store the HRA. In particular, this can be done without any indication to the user, so as to protect against users who may wish to tamper with the card and remove the HRA. This method is more effective if the card carries a tamper-proof hardware component or data (e.g., encrypted data) that is not easily read/removed by the user. When the card is subsequently used in an attempt to gain access to any (even fully disconnected) door, the card may communicate its HRA to the door, which, upon proper verification, may deny access (and, in some instances, store the HRA).

The HRA may be sent over a wireless channel (e.g., via a pager or cellular network or via satellite) to the card itself. This may be accomplished even if the card has limited communication capabilities—for example, by placing a wireless transmitter at a location that each user is likely to pass. For instance, at a building, such a transmitter may be placed at every building entrance, to provide an opportunity for every card to receive the transmission whenever a user of one of the cards enters the building. Alternatively, the transmitter may be placed at the entrances to the parking lot, etc.

To prevent a malicious user from blocking the transmission (by, for example, wrapping the card in material that will be impenetrable by the transmitted signal), the card may in fact require that it receive periodic transmissions in order to function properly. For example, the card may expect a signal every five minutes in order to synchronize its clock with that of the system, or may expect to receive another periodic (preferably digitally signed) signal, such as a GPS signal, or just expect appropriate noise at the appropriate frequencies. If such a signal is not received with a reasonable time interval, the card may "lock out" and simply refuse to communicate with any door, this making itself unfit for access. Note that such a system may be more economical and convenient than simply broadcasting all HRAs to all cards, because HRAs are custom and continually changing messages. Thus, broadcasting HRA's to all cards may require putting up a special purpose satellite or customizing an already existing one. The above method instead takes advantage of already available signals for broad transmissions and installs very local transmitters for the custom messages.

Alternatively, a user may be prevented from blocking transmissions to a card if the security policy requires the user to wear the card visibly, as a security badge, or to present it at an appropriate place (within transmission range) to a guard. An additional technique for disseminating an HRA for a particular card/credential/proof may include using OTHER cards to carry the HRA to doors. In a version of this, Card 1 may (e.g., when picking up its own daily credential/proof, or wirelessly, or when communicating with a connected door, or when making any kind of connection) receive an HRA, HRA2, revoking a credential/proof associated with a different card, Card 2. Card 1 may then store HRA2 and communicate HRA2 to a door, which then also stores HRA2. Card 1 may in fact provide HRA2 to multiple doors, e.g., to all doors or all disconnected doors that access or communicate with Card 2 for a particular period of time (e.g., for an entire day). At this point, any door (even if disconnected) reached by Card 1 may be able to deny access to the holder of Card 2 that contains the revoked credential/proof. Preferably, HRA2 is digitally signed or self authenticating, and any door reached by Card 1 checks the authenticity of HRA2 so as to prevent the malicious dissemination of false HRAs.

This may be enhanced by having a door reached by Card 1 communicate the learned HRA2 to another card, Card 3, that subsequently accesses it or communicates with the door. This is useful because Card 3 may reach doors that Card 1 will not reach or will reach later than Card 3. This process may continue by having these additionally reached doors communicate to other cards, etc. Moreover, it is possible that some doors, even though not fully connected to a central database, may have connections to each other. Such doors thus may exchange available HRAs similarly. If cards have communication capability with each other—e.g., when in proximity—they may also exchange information about HRAs that they store.

Note that authenticated HRAs may be particularly advantageous with the HRA dissemination techniques discussed herein. Indeed, sending HRAs through multiple intermediaries (cards and doors) may provide multiple points of failure where HRAs may be modified or false HRAs may be injected by an adversary. In a sense, unauthenticated HRAs may become mere rumors by the time they reach the doors. Authenticated HRAs, on the other hand, may be guaranteed to be correct no matter how they reach the doors.

In instances where resources are not a significant concern, all HRAs could be stored and disseminated in this manner. It may also be possible to adopt some optimizations. For instance, a card may manage HRA storage like a door, and remove expired HRAs to free internal card storage and to prevent unnecessary communication with other doors. Minimizing storage and communication may be useful within such a system, because, even though the number of unexpired revoked credentials may be short, it is possible that some components (e.g., some cards or doors) may not have enough memory or bandwidth to handle all unexpired HRAs.

Another possibility for minimizing storage and communication includes selecting which HRAs are to be disseminated via which cards. For instance, HRAs may come with priority information, indicating the relative importance of spreading knowledge about a particular credential/proof as quickly as possible. For example, some HRAs may be labeled "urgent" while others may be labeled "routine." (A gradation of priorities may be as fine or coarse as appropriate.) Devices with limited bandwidth or memory may record and exchange information about higher-priority HRAs, and only if resources permit, may devote their attention to lower-priority ones. As another example, an HRA that prevents a card to access a given door may be disseminated via cards that are more likely to quickly reach that door (e.g., cards whose credential enables access to that door or doors in its vicinity). Indeed, the card and the door may engage in a communication with the goal of establishing which HRAs to accept for storage and/or further dissemination. Alternatively, HRAs or cards to store them may be selected in a way that involves randomness, or a door may provide an HRA to a certain number of cards (e.g., the first k cards the door "encounters").

The use of such dissemination techniques may reduce the likelihood that a user with revoked credentials/proofs will be able to gain access since even for a disconnected door a user would have to get to the door before any other user provides an appropriate HRA thereto with an up-to-date card. The exchange of information among cards and doors may help ensure that many cards are quickly informed of a revocation. This approach may also be used as a countermeasure against "jamming" attacks that attempt to disconnect a connected door and prevent the door from receiving the HRA. Even if the jamming attack succeeds and the door never gets informed of the HRA by the central servers or responders, an individual user's card may likely inform the door of the HRA anyway. It is noted that the actual method of exchanging the HRAs among cards and doors may vary. In case of a few short HRAs, it may be most efficient to exchange and compare all known HRAs. If many HRAs are put together in one list, the list may contain a time indicating when the list was issued by the server. Then the cards and doors may first compare the issue times of their lists of HRAs, and the one with older list may replace it with the newer list. In other cases, more sophisticated algorithms for finding and reconciling differences may be used.

Efficient HRA dissemination may be accomplished by (1) issuing an authenticated HRA; (2) sending the authenticated HRA to one or more cards; (3) having the cards send the authenticated HRA to other cards and/or doors; (4) having doors store and/or transmit to other cards the received HRAs.

It may be useful to present in detail some sample HRA use:

SEQUENCE 1 (directly from "authority" to door):
1. Entity E revokes a credential/proof for a user U and issues an HRA A containing the information that the credential/proof has been revoked;
2. A is transmitted via wired or wireless communication to a door D;
3. D verifies the authenticity of A and, if verification succeeds, stores information about A;
4. When U attempts to access D by presenting the credential/proof, the door D observes that the stored information about A indicates that the credential/proof is revoked and denies access.

SEQUENCE 2 (from "authority" to a user's card to door):
1. Entity E revokes a credential/proof for a user U and issues an HRA A containing the information that the credential/proof has been revoked;
2. Another user U' reports to work and presents his card to E in order to obtain his current credential/proof;
3. Along with the current credential/proof for U', the HRA A is transmitted to the card of U'; the card stores A (the card may or may not verify the authenticity of A, depending on the card's capabilities);
4. When U' attempts to access a door D, his card transmits his credential/proof along with A to D
5. D verifies the authenticity of A and, if verification succeeds, stores A;
6. When U attempts to access D by presenting his credential/proof, the door D observes A revoking U's credential/proof and denies access.

SEQUENCE 3 (from "authority" to another door to a user's card to door):
1. Entity E revokes a credential/proof for a user U and issues an HRA A containing the information that U's credential/proof has been revoked;
2. A is transmitted via wired or wireless communication to a door D';
3. D' verifies the authenticity of A and, if verification succeeds, stores A;

4. Another user U' with his own credential/proof presents his card to D' in order to gain access to D'. D', in addition to verifying credentials/proofs of U' and granting access if appropriate, transmits A to the card of U'. The card stores A (the card may or may not verify the authenticity of A, depending on the card's capabilities).
5. When U' attempts to access a door D, his card transmits his own credential/proof along with A to D
6. D' verifies the authenticity of A and, if verification succeeds, stores A;
7. When U attempts to access D by presenting his credential/proof, the door D observes A revoking U's credential/proof and denies access.

SEQUENCE 4 (from "authority" to the user's card to door):
1. Entity E revokes a credential C for a user U and issues an HRA A containing the information that C has been revoked;
2. The user U, carrying his card, passes a transmission point located near the building entrance, which causes his card to receive A; the card stores A (the card may or may not verify the authenticity of A, depending on the card's capabilities);
3. When U attempts to access a door D, his card transmits A along with C to D
4. D verifies the authenticity of A and, if verification succeeds, stores A and denies access to U;
5. If U again attempts to access D by presenting C, the door D observes the previously stored A revoking C and denies access.

Sometimes it may be useful to establish, after the fact, who attempted to access a particular door, at what time, what credentials/proofs were presented, and whether access was denied or granted. It may also be useful to know if a door's mechanism became jammed, if a switch or sensor failed, etc. To this end, it may be desirable to maintain event logs of the events that take place. Such logs may be particularly useful if readily available at some central location so that they may be inspected and acted upon. For instance, in case of hardware failure, a repair team may need to be dispatched promptly. There are, however, two major problems with such logs.

First, if a door is connected, it may be easier to collect logs by sending them via the connection. However, collecting event logs may be more difficult for disconnected doors. Of course, one way to collect logs is to send a person to every disconnected door to physically deliver the logs back to the central location, but this approach is costly.

Second, for an event log to be believed, the integrity of the whole system surrounding the generation, collection and storage of the logs should be guaranteed. Else, for instance, an adversary may create false log entries or delete valid ones. Traditional approaches such as physically securing the communication channels and data storage facilities are very costly (and may not be sufficient by themselves).

Conventional logs may vouch that "a certain user went to a certain door" by the mere existence of such a log entry, which must be assumed to be valid. However, this may not be appropriate for a high-security application. Consider a user U accused of damaging some property behind a locked door D. A traditional log entry may provide only weak evidence that U entered D: one would have to trust that no one maliciously falsified the log entry. Thus, it is desirable to have logs that provide much stronger evidence, because they may not be "manufactured" by an enemy. In particular, indisputable logs may prove that door D (possibly with the cooperation of U's card) created the record in the log.

The system described herein addresses this in the following manner: Whenever a door receives a credential/proof presented as part of a request for access, the door may create a log entry (e.g., a data string) containing information about the event, for example:
time of request;
type of request (if more than one request is possible—for example, if the request is for exit or for entry, or to turn the engine on or off, etc.);
credential/proof and identity presented (if any);
whether the credential/proof verified successfully;
whether the credential/proof had a corresponding HRA;
whether access was granted or denied.

Log entries may also contain operational data or information on any unusual events, such as current or voltage fluctuations, sensor failures, switch positions, etc. One way to produce an indisputable log includes having the door digitally sign event information by means of a secret key (SK). The resulting indisputable log may be represented by SIG(event, AI), where AI stands for any additional information. The signature method used by door D may be public-key or private-key.

If it is useful to emphasize the public key PK relative to which the signature is valid, or the secret key SK used in producing the signature, or the door that generated the signature, it may be possible to symbolically represent the indisputable log by $SIG_{PK}$(event,AI), $SIG_{SK}$(event,AI), or $SIG_D$(event,AI).) Such a log may be indisputable because an enemy may not forge the door's signature without knowing the relevant secret key. On the other hand, the authenticity of the log could be checked by any properly informed verifier (e.g., one that knows the door's PK or the door's SK) without having to trust the integrity of the database storing the log, or that of the system transmitting the log. In general, logs may be made indisputable not only by digitally signing each entry, but also by using a digital authentication step for multiple entries. For instance, the door could authenticate a multiplicity of events E1, E2, . . . by means of a digital signature: symbolically, SIG(E1, . . . ,E2,AI). As usual, here and anywhere in this application, a digital signature may mean the process of digitally signing the one-way hash of the data to be authenticated. In particular, stream authentication may be viewed as a special case of digital signature. For instance, each authenticated entry could be used to authenticate the next (or the previous) one. One way to do this consists of having an authenticated entry include the public key (in particular, the public key of a one-time digital signature) used for authenticating the next or other entries.

Logs and indisputable logs may also be made by cards (in particular, a card may make an indisputable log by digitally signing information about an event E: in symbols, SIG(E, AI)). All of the log techniques described herein may also be construed to relate to card-made logs.

In addition, other logs and indisputable logs may be obtained by involving both the door and the card. For instance, during a request of door access, the card may provide to the door the card's own (possibly indisputable) log entry to the door. The door may inspect the log entry and grant access only if the door finds the log entry "acceptable." For instance, the door may verify the digital signature of the card authenticating the log entry; or the door may verify that time information included in the card's log entry is correct according to a clock accessible to the door.

Other types of indisputable logs may be obtained by having both the door and the card contribute to the generation and/or authentication of a log entry. For instance, the card may authenticate a log entry and the door may then also authenticate at least part of the log entry information, and vice versa.

In a particular embodiment, a card C may give the door its signature, $x=SIG_c(E,AI)$, of the log entry, which the door will countersign—in symbols, $SIG_D(x,AI')$—and vice versa. Alternatively, the door and the card may compute a joint digital signature of the event information (e.g., computed by means of a secret signing key split between the door and the card, or by combining the door's signature with that of the card into a single "multi" signature). Several multi-signature schemes may be used, in particular that of Micali, Ohta and Reyzin.

It is possible to include additional information into the logs. It may then be checked if the information as reported by the card and as reported by the door agrees. For instance, both the card and the door may include time information into the log entries, using clocks available to them. In addition, the card (and possibly also the door) may include location information (such as obtained from GPS) into the log entry. Alternatively, if current location is unavailable (e.g., because GPS reception capability is unavailable), information on latest known location (and possibly how long ago it was established) may be included. This way, particularly in the case of a mobile door (such as the door of an airplane), it may be possible to establish where the door and the card were located when the event occurred.

Of course, even an indisputable log entry as above may be maliciously deleted from the database or prevented from reaching the database altogether. To protect against such deletions, it is useful to provide a Deletion-Detectable Log Systems. Such systems may be built by using (1) an authentication scheme (e.g., a digital signature scheme), (2) a correlation-generating scheme and (3) a correlation-detection scheme as follows. Given one log event E (part of a sequence of—possibly past and/or future—events), the correlation-generating scheme may be used to generate correlation information CI, which is then securely bound to E by means of the authentication scheme to generate a deletion-detectable log entry. The correlation-generating scheme may ensure that, even if events themselves are uncorrelated and the existence of one event may not be deduced from the existence of other events, CI is generated in such a way as to guarantee that for missing log entries no properly correlated information is present, something that can be detected using the correlation-detection scheme. In some instances, the system may also guarantee that even if some log entries are missing, others can be guaranteed authentic and/or individually indisputable.

In a first example, the correlation information CI of the log entries may include sequentially numbering the log entries. The corresponding correlation-detection scheme may consist of noticing the presence of a gap in the numbering sequence. But to obtain a deletion-detectable log system, a proper binding between CI and the log entries is found, which may not be easy to do, even if secure digital signatures are used for the authentication component of the system. For instance, having the i-th log entry consist of (i,SIG(event,AI)), is not secure, because an enemy could, after deleting a log entry modify the numbering of subsequent entries so as to hide the gap. In particular, after deleting log entry number 100, the adversary may decrease by one the numbers of log entries 101, 102, etc. The enemy may so hide his deletions because, even though the integrity of the event information is protected by a digital signature, the numbering itself may not be. Moreover, even digitally signing also the numbers may not work. For instance, assume that the i-th log entry consists of (SIG(i), SIG(event,AI)). Then an enemy could: (1) observe and remember SIG(100), (2) delete entry number 100, (3) substitute SIG(100) in place of SIG(101) in original entry 101, while remembering SIG(101), and so on, so as to hide the deletion-completely.

Neither of the above two methods produces the desired secure binding of CI and log entries. Indeed, by securely binding (1) the numbering information together with (2) the event being numbered, we mean that an enemy may not manufacture the binding of some number j together with event information about the i-th event Ei, when j is different than i, even if provided with (a) a secure binding of number i and Ei and (b) a secure binding of number j and Ej. For instance, the i-th log entry may consist of SIG(i,Ei,AI). This way, the deletion of the i-th log entry will be detected given later log entries. This is so because a later log entry may carry with it a number greater than i, which cannot be removed, modified or switched with another log-entry numbering information by the adversary, because it is securely bound to the log entry. For instance, assume the adversary deletes the log entry number 100: SIG(100,E100,AI). As long as the adversary cannot delete all subsequent log entries (which would require continual access to the database), to hide his deletion, the adversary would need to create another log entry with the same number 100. However, this may be difficult because (a) the adversary cannot generate a brand new 100th log entry SIG(100,E',AI') since he does not have the door's secret signing key; (b) the adversary cannot modify an existing log entry without invalidating the digital signature (e.g., cannot change SIG(101,E101,AI101) into SIG(100, E101, AI101) even if he remembers the deleted entry SIG(100, E100,AI100)); (c) the adversary cannot extract a signature of a portion of the log entry indicating the number 100 and bind it with a digital signature to another log entry.

Such secure binding can also be achieved by means other than digitally signing together the entry number and the event being numbered. For instance, it can be achieved by one-way-hashing the entry number and the event being numbered and then signing the hash, symbolically SIG(H(i,Ei,AI)). As for another example, it can be achieved by including the hash of the number into the digital signature of the event or vice versa: e.g., symbolically SIG(i,H(Ei),AI)). It can also be achieved by signing the numbering information together with the digital signature of the event information: e.g., symbolically SIG (i,SIG(Ei),AI)). As yet another alternative, one can separately sign (1) the numbering information together with a unique string x, and (2) the event information together with the string x, symbolically (SIG(i,x), SIG(x,Ei,AI)). (Such string x could be a nonce.)

Deletion-detectable logs may also be achieved by securely binding with the log entry correlation information other than sequential numbering information. For instance, one can include in log entry i some identifying information from a prior log entry, for example, entry i−1. Such information may be a collision-resistant hash of entry i−1 (or a portion of log entry i−1): symbolically, log entry i can be represented as SIG(H(log entry i−1), Ei, AI). Then if the adversary attempts to remove log entry i−1, such removal would be detected when log entry i is received, because the hash of the previously received log entry, H(log entry i−2), would not match H(log entry i−1) (because of the collision-resistance of H), whereas H(log entry i−1), because it is securely bound to log entry-i, could not be modified by the adversary without destroying the validity of a digital signature. Here by log entry i we may also mean a subset of its information, such as Ei.

Note that it need not be log entry i−1 whose information is bound with entry i: it may be another prior or future entry, or, in fact, a multitude of other entries. Moreover, which log entries to bind with which ones may be chosen with the use of randomness.

Other correlation information may also be used. For instance, each log entry i may have securely bound with it two values (e.g., random values or nonces) $x_i$ and $x_{i+1}$: symbolically, e.g., $SIG(x_i, x_{i+1}, Ei, AI)$. Then two consecutive log entries may always share one x value: for instance, entries i and i+1 will share $x_{i+1}$. However, if a log entry is deleted, this will no longer hold (because the adversary cannot modify signed log entries without detection unless it knows the secret key for the signature). For instance, if entry number 100 is deleted, the database will contain $SIG(x_{99}, x_{100}, E99, AI)$ and $SIG(x_{101}, x_{102}, E101, AI)$ and one can observe that they are not sharing a common x value. Such correlation information may take other forms: in fact, a log entry may be correlated with multiple other log entries. This can be accomplished, in particular, by use of polynomials to generate correlation information (e.g., two or more log entries may each contain the result of evaluating the same polynomial at different inputs). Such correlation information may also make use of a hash chain: for instance, starting with a value $y_1$, let $y_2 = H(y_1)$, $y_3 = H(y_2)$, ..., etc., and then securely bind $y_i$ with Ei: e.g., the i-th log entry may be symbolically represented as $SIG(y_i, Ei, AI)$. Then consecutive log entries i and i+1 may have correlation values $y_i$ and $y_{i+1}$ such that $y_{i+1} = H(y_i)$. If the adversary deletes a log entry, however, this may no longer hold and thus deletion can be detected. For instance, if entry 100 is deleted, the database will contain $SIG(y_{99}, E99, AI)$ and $SIG(y_{101}, E101, AI)$ (which, as before cannot be modified by the adversary without distorting the digital signatures). Then the deletion can be detected because $H(y_{101})$ will not match $y_{99}$. Use of multiple hash chains, perhaps used non-consecutive entries and in both directions, may also provide: such correlation information.

In another embodiment, each log entry may contain an indication of some or all of the previous or even subsequent events, thus making logs not only deletion-detectable, but also reconstructible in case of deletions. Reconstructible log systems may be built by using (1) an authentication scheme (e.g., a digital signature scheme), (2) a reconstruction-information-generating scheme and (3) a reconstructing scheme as follows. Given one log event E (part of a sequence of—possibly past and/or future—events), the reconstruction-information-generating scheme is used to generate reconstruction information RI, which is then securely bound to other log entries by means of the authentication scheme. The reconstruction-information-generating scheme ensures that, even if the log entry corresponding to event i is lost, other log entries contain sufficient information about E so as to allow reconstruction of E from RI present in other log entries. For instance, the i+1$^{st}$ entry may contain information about all or some of the previous i events, generated by the reconstruction-information-generating scheme. Therefore, if an enemy succeeded somehow in erasing the j-th log entry from the database, information about the j-th event Ej will show up in one or more subsequent entries, making it possible to reconstruct information Ej even in the absence of the j-th log entry, using the reconstructing scheme. Thus, it would not be enough for an enemy to have temporary access to the database: he would have to monitor the database "all the time" and delete multiple log entries to prevent information about the j-th event from being revealed. Choosing which events to include into a log entry can be done by the reconstruction-information-generating scheme in a randomized fashion, so as to make it harder for an enemy to predict when information about a given event will show up in successive logs. Preferably, the system for reconstructible logs may also be deletion-detectable and indisputable.

Note also that reconstruction information about event j included into another log entry need not be direct. It may consist of a partial entry j, or of its hash value $h_j$ (in particular, computed by the reconstruction-information-generating scheme via a one-way/collision-resistant hash function), or of its digital signature, or of any other indication. In particular, if a one-way collision-resistant hash function H is used, then it is possible to indisputably restore information about the j-th event from a log entry i which contains $h_j$: symbolically, if the i-th entry is signed, the corresponding indisputable log may take the form $SIG(h_j, Ei, AI)$. For instance, if one suspects that a particular user entered a particular door at a particular time, one can test if the value $h_j$ matches the hash $H(Ej)$ of a log entry Ej that would have been created in response to such an event. This is indisputable because of the collision-resistance property of H: it is essentially impossible to come up with an entry E'j different from Ej such that $H(E'j) = H(Ej)$.

Log entries Ej may be created in a way that would make it easier for one to guess (and hence verify) what the log entry for a given event should be (for instance, by using a standardized format for log entries, using a coarse time granularity, etc.). One-way hash may be particularly useful because of its small size: it may be possible to hash many or even all prior log entries for inclusion into a subsequent entry. For instance, entry i+1 can include $h_1 = H(E_1)$, $h_2 = H(E_2)$, ..., $h_i = H(E_i)$. Alternatively, one can nest (some of) the hashes, thus reducing the amount of space required. For instance, if one nested them all, then the second log entry would include $h_1 = H(E_1)$, the third log entry would include $h_2 = H(E_2, h_1)$, .... Thus, if one can reconstruct or observe log entries 1 through i−1 and log entry i+1, then one can indisputably reconstruct log entry i. This system may be improved by encrypting (some of) the information in a log entry (e.g., with a key known only to the database), so that the enemy cannot see which information he must destroy in order to compromise reconstructibility of a particular event. Actually, once the log is protected by encryption, such encrypted logs (preferably indisputable encrypted logs) can be shipped to another (second) database without any loss of privacy. This makes deletions even more difficult for an enemy: now he has to gain access to two or more databases to falsify logs.

Reconstructible logs may also be achieved through use of error-correcting codes. In particular, this can be done by generating multiple components ("shares") of each log entry and sending them separately (perhaps with other log entries) in such a way that, when sufficiently many shares have been received, the log entry may be reconstructed by the reconstructing scheme, which may invoke a decoding algorithm for the error-correcting code. These shares can be spread randomly or pseudorandomly, thus making it harder for the adversary to remove sufficiently many of them to prevent reconstruction of a log entry when enough shares eventually arrive.

Event logs (whether created by cards, by doors, or jointly by both) may be carried by cards to facilitate their collection. When a card reaches a connected door, or communicates with a central server, or is otherwise able to communicate with the central database, it can send the logs stored in it. This can be done similarly to the dissemination of HRAs, except that HRAs may be sent from a central point to a card, whereas logs may be sent from the card to the central point. All the methods of disseminating HRAs, therefore, apply to the collection of event logs. Specifically, a method for disseminating HRAs can be transformed into a method for collecting event logs by (1) substituting a sender for the receiver and vice versa; (2) replacing an HRA with a log entry.

In particular, a card C1 may collect events logs for events unrelated to C1, such as access by another card C2, or a malfunction of a door D. Moreover, event logs for one door D1 may be stored (perhaps temporarily) on another door D2 (perhaps carried there by a card C1). Then, when another card C2 communicated with D2, it may receive some of these log entries and later communicate them to another door or to a central location. This broad dissemination may ensure that event logs reach the central point faster. (Moreover, it is possible that some doors, even though not fully connected to a central database, may have connections to each other. Such doors thus may exchange available event logs similarly. If cards have communication capability with each other—e.g., when in proximity—they may also exchange information about event logs that they store.) In such collecting process, indisputable logs are advantageous, because they do not need to be carried over secured channels, as they cannot be falsified. Therefore, they do not rely on the security of cards or connections between cards and doors. Deletion-detectable logs provide additional advantages by ensuring that, if some log entries are not collected (perhaps because some cards never reach a connected door), this fact may be detected. Reconstructible logs may additionally allow for reconstruction of log entries in case some log entries do not reach a central database (again, perhaps because some cards never reach a connected door).

In some instances, all event logs could be stored and disseminated in this manner. Else, it may be useful to adopt some optimizations. One optimization approach is to have event logs come with priority information, indicating the relative importance of informing a central authority about a particular event. Some log entries may be of more urgent interest than others: for instance, if a door is stuck in an open or closed position, if unauthorized access is attempted, or if unusual access pattern is detected. In order to speed the delivery of such important information to the location where it can be acted upon, information in access logs may be labeled with tags indicating its importance (or its importance may be deduced from the information itself). For example, some log entries by numbers or codewords that indicate their degree of importance. (A gradation of priorities may be as fine or coarse as appropriate.) More effort or higher priority may be devoted to spreading information of higher importance. For instance, higher priority information may be given to more cards and/or doors in order to increase the likelihood that it will reach its destination sooner or more surely. Also, a card or a door, when receiving information of high priority, may make room for it by removing low-priority information from its memory. Likewise, a door may decide to give high-priority information to every card that passes by, whereas low-priority information may be given to only a few cards or may wait until such time when the door is connected.

Alternatively or in addition to the above techniques, cards may be selected to store particular log entries in a way that involves randomness, or a door may provide a log entry to a certain number of cards (e.g., the first k cards it "encounters"). The use of such dissemination techniques may significantly reduce the likelihood that an important entry in an event log will be unable to reach the central location where it can be acted upon. In particular, it may be used as an effective countermeasure against "jamming" attacks that attempt to prevent a broken door from communicating its distress. The actual method of exchanging the logs among cards and doors may vary. In case of a few entries, it may be most efficient to exchange and compare all known entries. In other cases, more sophisticated algorithms for finding and reconciling differences may be in order.

It may be useful to present in detail some sample ways in which event logs may be collected. Below, "authority" A includes some central point or database in which event logs are collected.

SEQUENCE 1 (directly from door to authority):
1. Connected door D creates an indisputable log entry E in response to an event.
2. E is transmitted via wired or wireless communication to the authority A.
3. A verifies the authenticity of E and, if verification succeeds, stores E.

SEQUENCE 2 (from door to a user's card to authority):
1. Door D creates an indisputable log entry E in response to an event.
2. A card C of a user U that is presented for access to D receives and stores E (in addition to access-related communication). The card may or may not verify the authenticity of E.
3. When U leaves work and presents his card to A at the end of the work day, E is transmitted to A by the card.
4. A verifies the authenticity of E and, if verification succeeds, stores E.

SEQUENCE 3 (from door to a user's card to another (connected) door to authority):
1. Door D creates an indisputable log entry E in response to an event.
2. A card C of a user U that is presented for access to D receives and stores E (in addition to access-related communication). The card may or may not verify the authenticity of E.
3. Later, U presents his card C for access to another (connected) door D'.
D', in addition to verifying credentials and granting access if appropriate, receives E from C. D' may or may not verify the authenticity of E.
4. E is transmitted by D' via wired or wireless communication to the authority A.
5. A verifies the authenticity of E and, if verification succeeds, stores E.

Protected areas may be defined by walls and physical doors, such as doors through which a human may enter, or doors of a container, of a safe, of a vehicle, etc. Protected areas may also be defined by virtual doors and walls. For instance, an area may be protected by a detector that can sense an intrusion, and possibly sound an alarm or send another signal if authorization is not provided. Such an alarm system is an example of a virtual door: in an airport, often entering the gate area through an exit lane will trigger such an alarm, even though no physical doors or Walls have been violated. Another example of a virtual door is a toll booth: even though many toll booths contain no physical bars or doors, a given car may or may not be authorized to go through the booth. Such authorization may depend, for instance, on the validity of a car's electronic toll billing token. Yet another example is that of a traffic control area. For instance, to enter the downtown of a given city, or a road leading to a nuclear facility, an army barrack, or another sensitive area, a vehicle must have proper authorization, for purposes such as billing, security or congestion control.

In addition, protection may not be needed only for areas, but also for devices, such as airplane engines or military equipment. For instance, it may be necessary to ensure that only an authorized individual can start the engines of an airplane or of a truck carrying hazardous materials.

There are many ways to use credentials/proofs for access control. Note that, for the disclosure herein, the term "day" below should be understood to mean general time period in a sequence of time periods, and "morning" to mean the beginning of a time period.

Throughout this application, "doors" should be construed to include all types of portals (e.g., physical and/or virtual), access-control systems/devices, and monitoring systems/devices. In particular, they include key mechanisms used to start engines and control equipment (so that our invention, in particular, can be used to ensure that only currently authorized users may start a plane, operate an earth-mover or otherwise access and control various valuable and/or dangerous objects, devices and pieces of machinery). Consistently with this convention, we shall refer to "entering" as being granted the desired access (whether physical or virtual).

Similarly, for concreteness but without loss of generality intended, a card may be understood to mean any access device of a user. It should be understood that the notion of a card is sufficiently general to include cellular phones, PDAs, and other wireless and/or advanced devices, and a card may include or operate in conjunction with other security measures, such as PINs, password and biometrics, though some of these may "reside" in the brain or body of the cardholder rather than in the card itself.

In addition, the expression "user" (often referred to as a "he" or "she") broadly, may be understood to encompass not only users and people, but also devices, entities (and collections of users, devices and entities) including, without limitation, user cards.

The system described herein may be implemented using any appropriate combination of hardware and software including, without limitation, software stored in a computer readable medium that is accessed by one or more processors. In addition, the techniques used for encryption, authentication, etc. may be combined and used interchangeably, as appropriate. In that regard, each of the following U.S. patents and applications is incorporated by reference herein:

U.S. provisional patent application No. 60/004,796, filed Oct. 2, 1995;
U.S. provisional patent application No. 60/006,038 filed on Oct. 24, 1995;
U.S. provisional patent application No. 60/006,143, filed Nov. 2, 1995,
U.S. provisional patent application No. 60/024,786, filed Sep. 10, 1996;
U.S. provisional patent application No. 60/025,128, filed Aug. 29, 1996;
U.S. provisional patent application No. 60/033,415, filed Dec. 18, 1996;
U.S. provisional patent application No. 60/035,119, filed Feb. 3, 1997;
U.S. provisional patent application No. 60/277,244, filed Mar. 20, 2001;
U.S. provisional patent application No. 60/300,621, filed Jun. 25, 2001;
U.S. provisional patent application No. 60/344,245, filed Dec. 27, 2001;
U.S. provisional patent application No. 60/370,867, filed Apr. 8, 2002;
U.S. provisional patent application No. 60/372,951, filed Apr. 16, 2002;
U.S. provisional patent application No. 60/373,218, filed Apr. 17, 2002;
U.S. provisional patent application No. 60/374,861, filed Apr. 23, 2002;
U.S. provisional patent application No. 60/420,795, filed Oct. 23, 2002;
U.S. provisional patent application No. 60/421,197, filed Oct. 25, 2002;
U.S. provisional patent application No. 60/421,756, filed Oct. 28, 2002
U.S. provisional patent application No. 60/422,416, filed Oct. 30, 2002;
U.S. provisional patent application No. 60/427,504, filed Nov. 19, 2002;
U.S. provisional patent application No. 60/443,407, filed Jan. 29, 2003;
U.S. provisional patent application No. 60/446,149, filed Feb. 10, 2003;
U.S. provisional patent application No. 60/482,179 filed on Jun. 24, 2003
U.S. provisional patent application No. 60/488,645 filed on Jul. 18, 2003;
U.S. provisional patent application No. 60/505,640 filed on Sep. 24, 2003;
U.S. patent application Ser. No. 08/715,712, filed Sep. 19, 1996;
U.S. patent application Ser. No. 08/741,601, filed Nov. 1, 1996;
U.S. patent application Ser. No. 08/756,720, filed Nov. 26, 1996;
U.S. patent application Ser. No. 08/804,868, filed Feb. 24, 1997;
U.S. patent application Ser. No. 08/804,869, filed Feb. 24, 1997;
U.S. patent application Ser. No. 08/872,900, filed Jun. 11, 1997;
U.S. patent application Ser. No. 08/906,464, filed Aug. 5, 1997;
U.S. patent application Ser. No. 09/915,180, filed Jul. 25, 2001;
U.S. patent application Ser. No. 10/103,541, filed Mar. 20, 2002;
U.S. patent application Ser. No. 10/244,695 filed Sep. 16, 2002;
U.S. patent application Ser. No. 10/409,638, filed on Apr. 8, 2003;
U.S. patent application Ser. No. 10/876,275 filed on Jun. 24, 2004;
U.S. Pat. No. 5,604,804;
U.S. Pat. No. 5,666,416
U.S. Pat. No. 5,717,757;
U.S. Pat. No. 5,717,758;
U.S. Pat. No. 5,793,868;
U.S. Pat. No. 5,960,083;
U.S. Pat. No. 6,097,811; and
U.S. Pat. No. 6,487,658.

While the invention has been disclosed in connection with various embodiments, modifications thereon will be readily apparent to those skilled in the art. Accordingly, the spirit and scope of the invention is set forth in the following claims.

What is claimed is:

1. A method of logging events associated with accessing an area, comprising:

recording an event associated with accessing the area to provide an event recording, wherein the event recording is generated after an attempt to access the area, and wherein the event recording includes log entry information that logs the attempt to access the area and is created separately from information presented as part of a request for access during the attempt to access the area; and authenticating at least the event recording to provide an authenticated recording, wherein the authenticated recording is authenticated at least in part by a door used in the attempt to access the area, the authenticated recording being generated at the door, wherein the door is a disconnected door that, at least intermittently and while generating the authenticated recording, is not able to electronically communicate with any network, and wherein generating the authenticated recording at the door includes the door digitally signing at least one entry of the event recording.

2. A method, according to claim 1, wherein recording an event includes recording a time of the event.

3. A method, according to claim 1, wherein recording an event includes recording a type of event.

4. A method, according to claim 1, wherein recording an event includes recording credentials/proofs used in connection with the attempt to access the area.

5. A method, according to claim 1, wherein recording an event includes recording a result of the attempt.

6. A method, according to claim 4, wherein recording an event includes recording the existence of data other than the credentials/proofs indicating that access should be denied.

7. A method, according to claim 1, wherein recording an event includes recording additional data related to the area.

8. A method, according to claim 1, wherein authenticating the recording includes digitally signing the recording.

9. A method, according to claim 1, wherein authenticating at least the event recording includes authenticating the event recording and authenticating other event recordings to provide a single authenticated recording.

10. A method, according to claim 9, wherein the single authenticated recording is stored on a card.

11. A method, according to claim 1, wherein the authenticated recording is stored on a card.

12. A method, according to claim 11, wherein the card has an other authenticated recording stored thereon.

13. A method, according to claim 12, wherein the other authenticated recording is provided by the card in connection with the card being used to access the area.

14. A method, according to claim 13, wherein access is denied if the other authenticated recording may not be verified.

15. A method, according to claim 13, wherein a controller is provided in connection with accessing the area and wherein the controller further authenticates the other authenticated recording.

16. A method, according to claim 12, wherein the other authenticated recording is authenticated using a digital certificate.

17. A method, according to claim 1, further comprising:
a user presenting a card to attempt to access the area.

18. A method, according to claim 17, further comprising:
the card further authenticating the authenticated recording in connection with the user attempting to access the area.

19. A method, according to claim 17, wherein a controller is provided in connection with accessing the area and wherein the controller and the card together further authenticate the authenticated recording.

20. A method, according to claim 1, further comprising:
providing correlation generation data that indicates the contents of the authenticated recording.

21. A method, according to claim 20, wherein the correlation generation data is bound to the authenticated recording.

22. A method, according to claim 20, wherein the correlation generation data is bound to the authenticated recording and wherein the resulting binding is authenticated.

23. A method, according to claim 22, wherein the resulting binding is digitally signed.

24. A method, according to claim 20, wherein the correlation generation data is a sequence of numbers and wherein a particular one of the numbers is assigned to the event.

25. A method, according to claim 24, further comprising:
authenticating a binding of the particular number and the event.

26. A method, according to claim 25, wherein authenticating the binding includes digitally signing the binding.

27. A method, according to claim 25, wherein authenticating the binding includes one way hashing the binding and then digitally signing the result thereof.

28. A method, according to claim 20, wherein correlation generation data for the event includes information identifying an other event.

29. A method, according to claim 28, wherein the other event is a previous event.

30. A method, according to claim 28, wherein the other event is a future event.

31. A method, according to claim 28, further comprising:
associating a first and second random value for the event;
associating at least one of the first and second random values with the other event; and
binding at least one of the first and second values to the other event.

32. A method, according to claim 20, wherein providing correlation generation data includes using a polynomial to generate the correlation information.

33. A method, according to claim 20, wherein providing correlation generation data includes using a hash chain to generate the correlation information.

34. A method, according to claim 20, wherein the correlation generation data includes information about a plurality of other events.

35. A method, according to claim 20, wherein the correlation generation data includes error correction codes.

36. A method, according to claim 1, further comprising:
disseminating the authenticated recording.

37. A method, according to claim 36, wherein disseminating the authenticated recording includes providing the authenticated recording on cards presented by users attempting to access the area.

38. A method, according to claim 1, wherein the area is defined by walls and the door.

39. A method of logging events associated with accessing an area, comprising:
recording an event associated with accessing the area to provide an event recording, wherein the event recording is generated after an attempt to access the area and wherein the event recording includes log entry information that logs the attempt to access the area and is created separately from information presented as part of a request for access during the attempt to access the area;
authenticating at least the event recording to provide an authenticated recording, wherein the authenticated recording is authenticated at least in part by a door used in the attempt to access the area, the authenticated recording being generated at the door, wherein the door is a disconnected door that, at least intermittently and while generating the authenticated recording, is not able to electronically communicate with any network, and wherein generating the authenticated recording at the door includes the door digitally signing at least one entry of the event recording; and disseminating the authenticated recording from the door via a transaction that is unrelated to the attempt to access the area.

40. The method, according to claim 39, wherein the transaction that is unrelated to the attempt to access the area includes providing the authenticated recording on a card used in another attempt to access the area, the card used in the another attempt to access the area being different from a card used in the attempt to access the area.

* * * * *